United States Patent [19]

Niwa et al.

[11] Patent Number: 4,614,521

[45] Date of Patent: Sep. 30, 1986

[54] TRANSFER RECORDING METHOD USING REACTIVE SUBLIMABLE DYES

[75] Inventors: Toshio Niwa, Yokohama; Yukichi Murata, Sagamihara; Shuichi Maeda, Saitama, all of Japan

[73] Assignee: Mitsubishi Chemical Industries Limited, Tokyo, Japan

[21] Appl. No.: 733,222

[22] Filed: May 10, 1985

[30] Foreign Application Priority Data

| | | | |
|---|---|---|---|
| Jun. 6, 1984 | [JP] | Japan | 59-116198 |
| Jun. 7, 1984 | [JP] | Japan | 59-117389 |
| Jun. 7, 1984 | [JP] | Japan | 59-117390 |

[51] Int. Cl.[4] ........................ D06P 5/00; G01D 15/10; G03C 5/54

[52] U.S. Cl. ........................................... 8/471; 8/474; 346/76 PH; 346/209; 430/201; 430/964

[58] Field of Search ................ 430/201, 964; 346/209, 346/76 PH, 135.1; 8/471, 474; 250/318

[56] References Cited

U.S. PATENT DOCUMENTS

| | | | |
|---|---|---|---|
| 4,078,886 | 3/1978 | De Fago et al. | 8/471 |
| 4,367,071 | 1/1983 | Mizuno et al. | 430/201 |

*Primary Examiner*—Richard L. Schilling
*Attorney, Agent, or Firm*—Jordan B. Bierman

[57] ABSTRACT

The transfer recording method which comprises heating a transfer sheet having a color material layer containing a sublimable dye on a base according to the image information received, thereby subliming said sublimable dye and transfer recording it on an image receiving layer of a recording sheet, a transfer recording method which is characterized by that the image receiving layer of the recording sheet contains a compound capable of reacting with the sublimable dye contained in the color material layer of the transfer sheet.

18 Claims, No Drawings

TRANSFER RECORDING METHOD USING REACTIVE SUBLIMABLE DYES

BACKGROUND OF THE INVENTION

1. Field of the Invention

This invention relates to a transfer recording method.

2. Description of the Prior Art

In office automation terminal such as facsimiles, printers, copying machines etc. which have lately been rapidly spread, there has been an increasing demand for color recording having a capacity for a great amount of information and also being visually preferable. On the other hand, the development of techniques of color recording of television images has been sought.

Currently, for these purposes, color recording techniques by electron photography, an ink-jet process, a heat-sensitive transfer process etc. are being under study.

Of those, the heat-sensitive transfer process is more advantageous as compared with the other processes since the maintenance and operation of the device are easier and the device and expendable supplies are less expensive.

The heat-sensitive transfer process may be classified into two, namely, a molten transfer process which comprises heat melting a dye layer formed on a base using a heat-sensitive head, thereby transfer recording on a recording sheet, and a sublimation transfer process which comprises forming a dye layer containing a sublimable dye on a base and heating it by a heat-sensitive head, thereby subliming the dye and transfer recording on a recording sheet, and the latter is believed particularly advantageous for full color recording, because gradation recording is easy since it is possible to control the amount of the dye to be sublimed and transferred by controlling the energy applied to the heat-sensitive head.

The dye for use in the above-described sublimation transfer process is desirably a dye as much sublimable as possible in order to reduce the burden on the heat-sensitive head or to increase the recording speed, but such an easily sublimable dye, during a long-term storage period or under high-temperature, high-moisture environment, had a problem with the recording stability, because the dye re-sublimed from the recording sheet and hence deteriorated the recording and migrated to contracted objects thus staining them.

As a method for solving such a problem, it is contemplated to prevent the re-sublimation by laminating the surface of the recording sheet with a resin film after transfer recording.

However, in such a method, since it is necessary to use a material and a device for laminating and also the device assembly itself becomes larger and more complicated, further improvement is being desired.

SUMMARY OF THE INVENTION

Accordingly, it is an object of this invention to provide a method for obtaining a transfer recording having excellent storage stability.

In other words, this invention resides in a transfer recording method which comprises heating a transfer sheet having a color material layer containing a sublimable dye on a base according to the image information received, thereby subliming said sublimable dye and transfer recording it on an image receiving layer of a recording sheet, which transfer recording method is characterized by that the image receiving layer of the recording sheet contains a compound capable of reacting with the sublimable dye contained in the color material layer of the transfer sheet.

DETAILED DESCRIPTION OF THE PREFERRED EMBODIMENTS

The transfer sheet used in the transfer recording method of this invention may be obtained by mixing a sublimable dye with an appropriate resin and solvent, water etc. to prepare an ink, coating said ink on an appropriate base and then drying thereby forming a color material layer.

The sublimable dye used in this invention may be selected from a wide variety of sublimable dyes usually used for sublimation type heat-sensitive transfer recording, and examples thereof are described in detail:

[A] Sublimable Dyes Capable of Reacting with an Epoxy Group or an Isocyanate Group:

The following dyes fall in this category: styrylic, indoaniline type, naphthoquinone type, azo type, anthraquinone type, nitro type, quinophthalone type, methine type and the like sublimable dyes having such groups as amino group, alkylamino group, hydroxyl group, carboxyl group, amido group, mercapto group etc. That is:

(i) The aforesaid styrylic dyes include styrylic dyes of the general formula [I]:

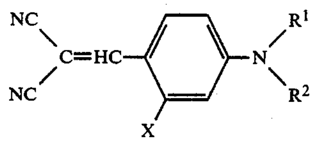

[I]

wherein X is hydrogen or methyl, $R^1$ is hydroxyalkyl, dialkylaminoalkyl, hydroxycarbonylalkyl, acylaminoalkyl or mercaptoalkyl, and $R^2$ is alkyl or hydroxyalkyl, and styrylic dyes of the general formula [II]:

[II]

wherein $R^3$ is hydrogen, hydroxyalkyl or dialkylaminoalkyl, and $R^2$ is as defined above.

Examples of preferred styrylic dyes are those of the following structural formulae:

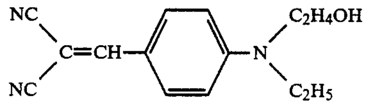

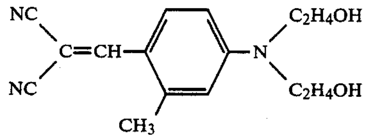

-continued

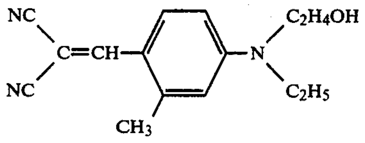

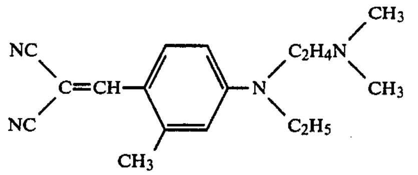

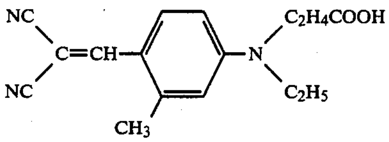

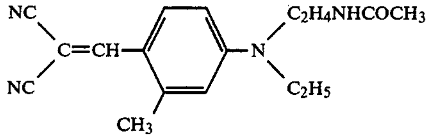

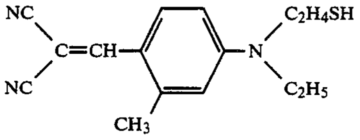

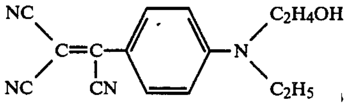

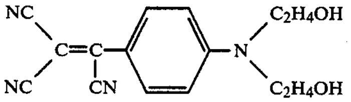

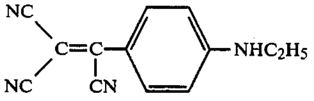

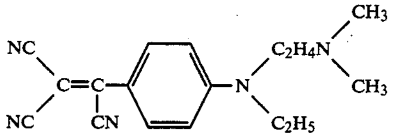

(ii) The aforesaid indoaniline type dyes include indoaniline type dyes of the general formula [III]:

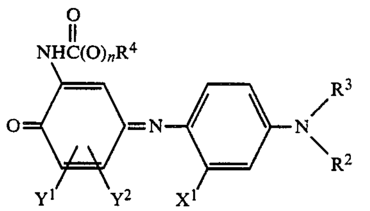

[III]

wherein n is 0 or 1, $R^4$ is alkyl or alkoxyalkyl, $Y^1$, $Y^2$ and $X^1$ are each hydrogen, methyl, methoxy, halogen, acylamino or alkoxycarbonylamino, and $R^2$ and $R^3$ are as defined above.

Examples of preferred indoaniline type dyes are those of the following structural formulae:

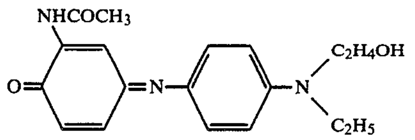

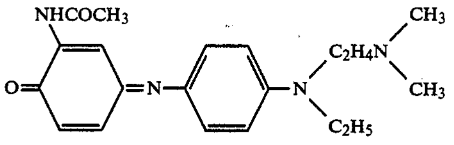

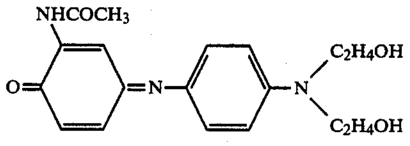

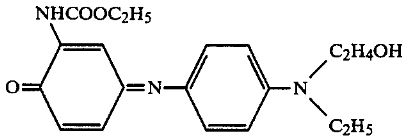

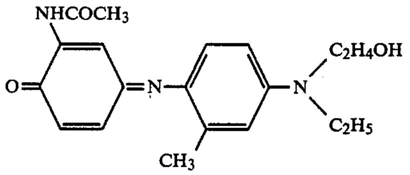

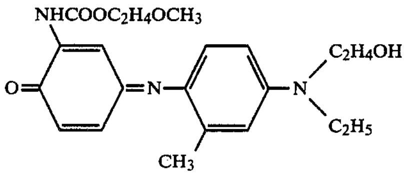

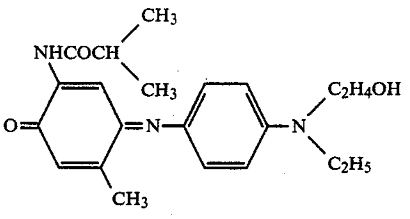

(iii) The aforesaid naphthoquinone type dyes include naphthoquinone type dyes of the general formula [IV]:

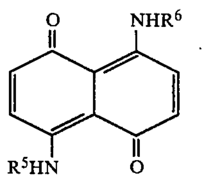

[IV]

wherein $R^5$ is hydrogen, hydroxyalkyl or dialkylaminoalkyl, and $R^6$ is hydrogen, alkyl, hydroxyalkyl or dialkylaminoalkyl, and a naphthoquinone type dye of the structural formula:

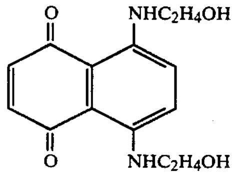

Examples of preferred naphthoquinone dyes are those of the following structural formulae:

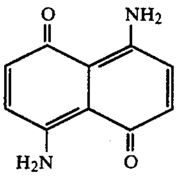

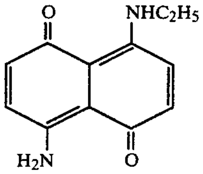

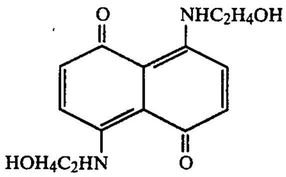

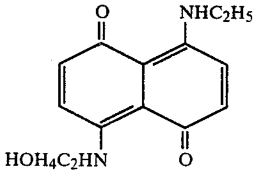

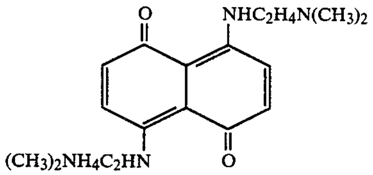

(iv) The aforesaid azo type dyes include azo type dyes of the general formula [XXXI]:

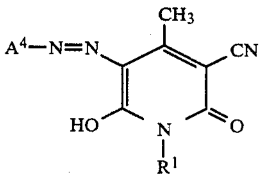

[XXXI]

wherein $A^4$ is optionally substituted phenyl, and $R^1$ is as defined above, and azo type dyes of the following structural formulae:

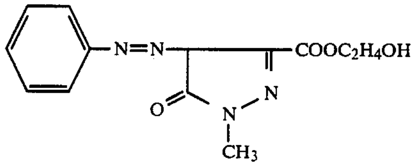

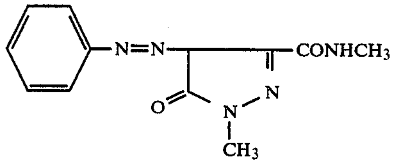

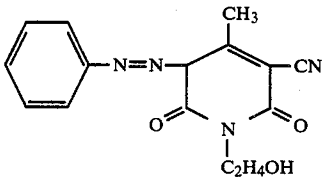

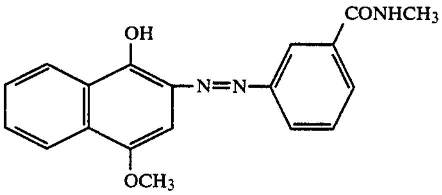

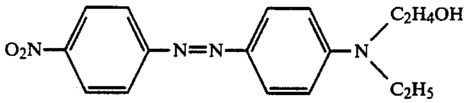

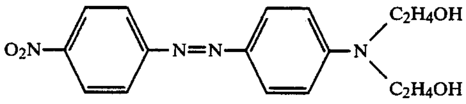

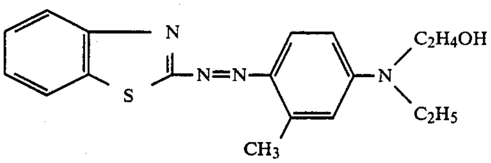

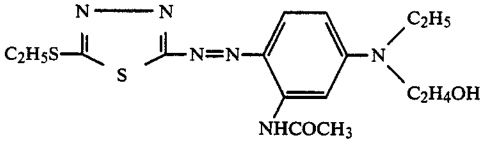

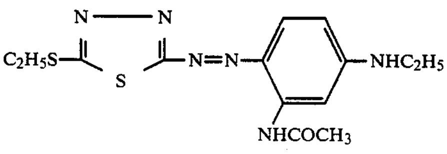

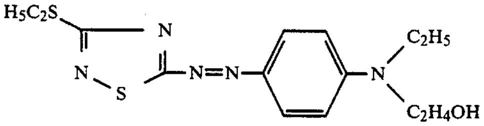

-continued
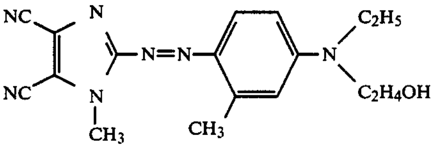
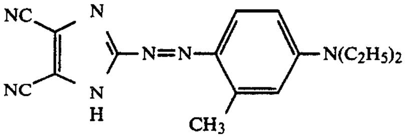
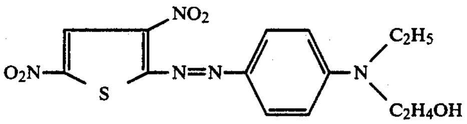
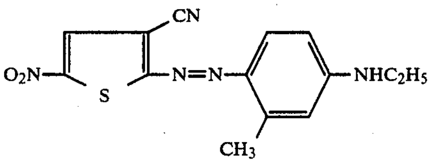
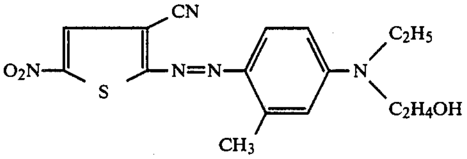
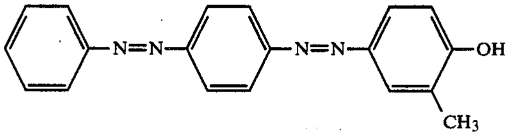
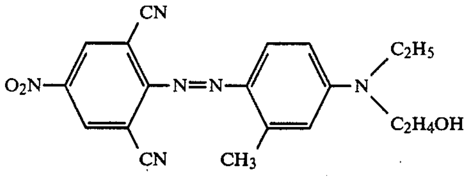
(v) The aforesaid anthraquinone type dyes include anthraquinone type dyes of the general formula [XXXII]:
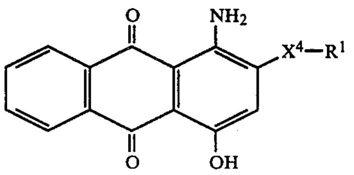
[XXXII]
wherein $X^4$ is —O— or —S—, and $R^1$ is as defined above, and anthraquinone type dyes of the following structural formulae:
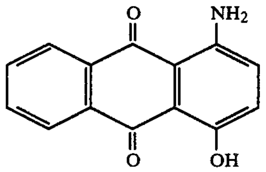
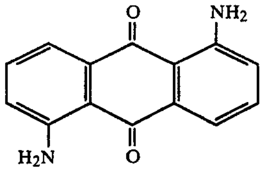
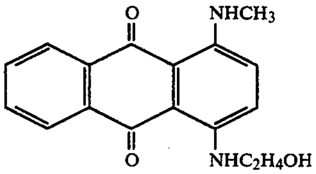
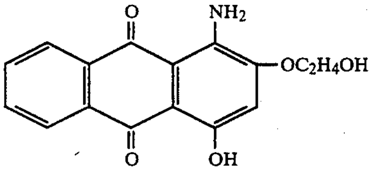
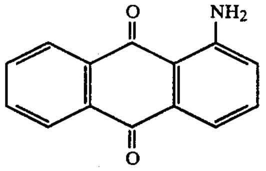
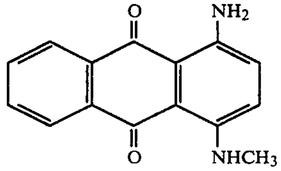
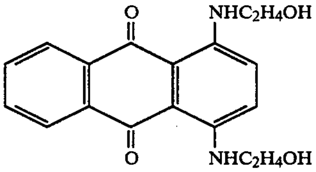
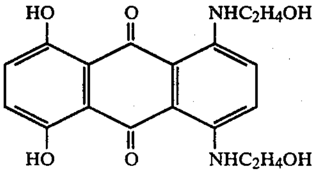
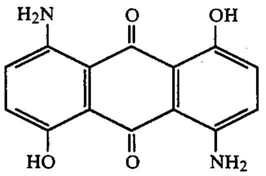

-continued

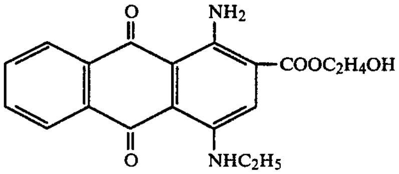

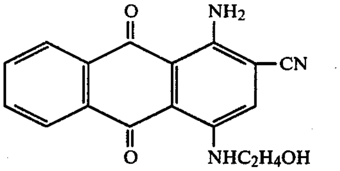

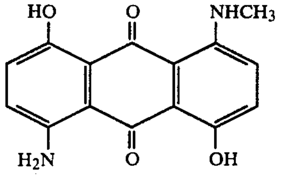

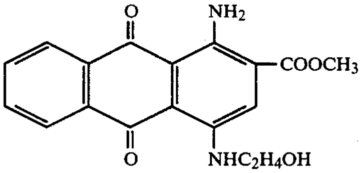

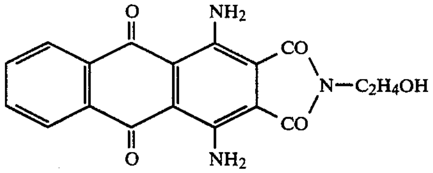

(vi) The aforesaid nitro type dyes include a nitro type dye of the following structural formula:

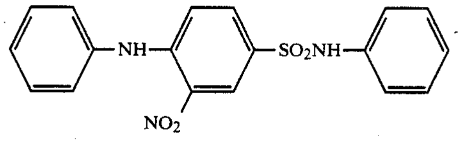

(vii) The aforesaid quinophthalone type dyes include a quinophthalone type dye of the following structural formula:

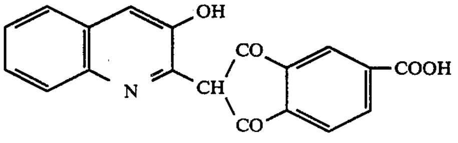

[B] Sublimable Dyes Having a Vinylsulfone Group:

The following dyes fall in this category: azo type, anthraquinone type, nitro type, naphthoquinone type, quinophthalone type and the like sublimable dyes having a vinylsulfone group. That is:

(i) The aforesaid azo type dyes include azo type dyes of the general formula [V]:

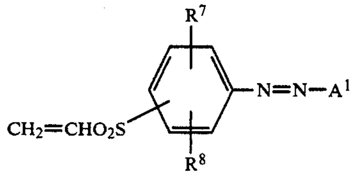

[V]

wherein $A^1$ is optionally substituted aminophenyl, pyrazolone, pyridone or pyridinyl, and $R^7$ and $R^8$ are each hydrogen, alkyl or alkoxy.

Examples of preferred azo type dyes are those of the following structural formulae:

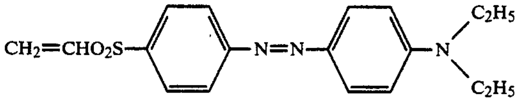

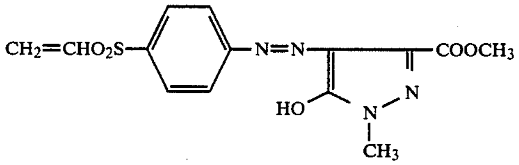

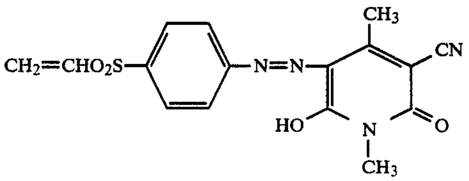

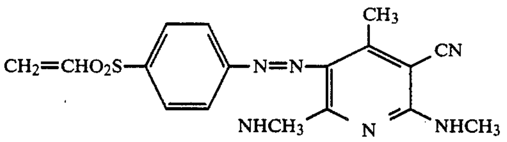

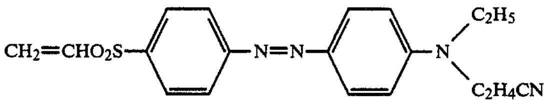

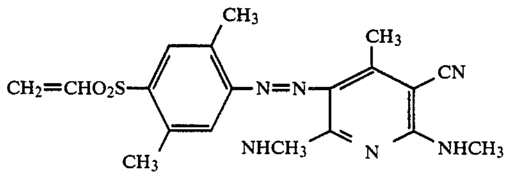

(ii) The aforesaid anthraquinone type dyes include anthraquinone type dyes of the general formula [VI]:

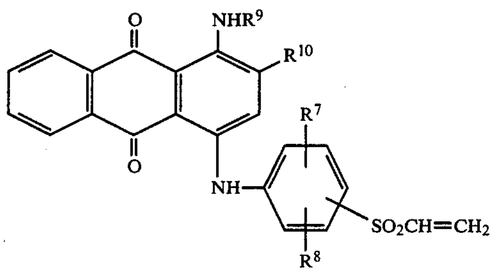
[VI]

wherein $R^9$ is hydrogen or alkyl, $R^{10}$ is hydrogen or cyano, and $R^7$ and $R^8$ are as defined above.

Examples of preferred anthraquinone type dyes are those of the following structural formulae:

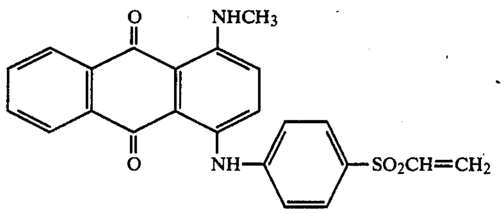

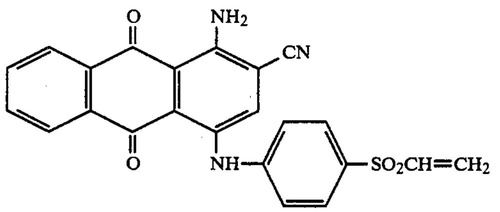

(iii) The aforesaid nitro type dyes include nitro type dyes of the general formula [VII]:

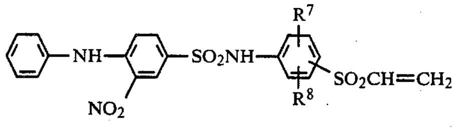
[VII]

wherein $R^7$ and $R^8$ are as defined above.

Examples of preferred nitro type dyes are those of the following structural formulae:

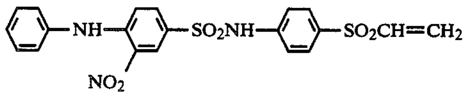

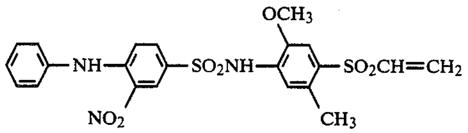

(iv) The aforesaid naphthoquinone type dyes include naphthoquinone type dyes of the general formula [XVIII] or [XIX]:

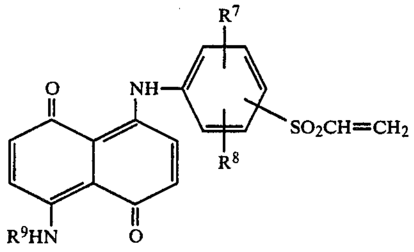
[XVIII]

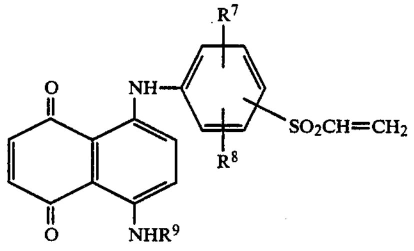
[XIX]

wherein $R^7$, $R^8$ and $R^9$ are as defined above.

Examples of preferred naphthoquinone type dyes are those of the following structural formulaes:

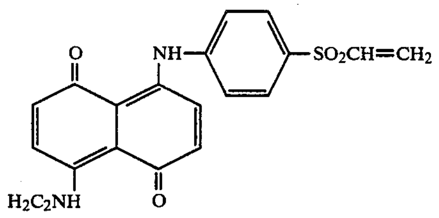

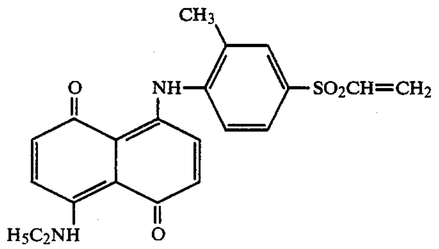

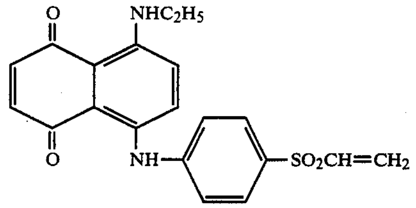

(v) The aforesaid quinophthalone type dyes include quinophthalone type dyes of the general formula [XX]:

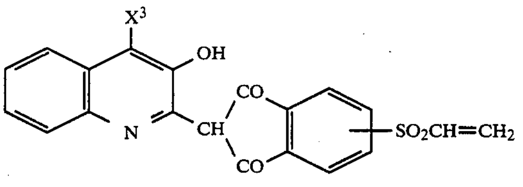
[XX]

wherein $X^3$ is hydrogen or halogen.

Examples of preferred quinophthalone type dyes are those of the following structural formulae:

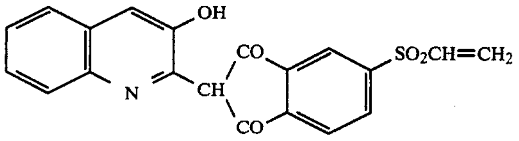

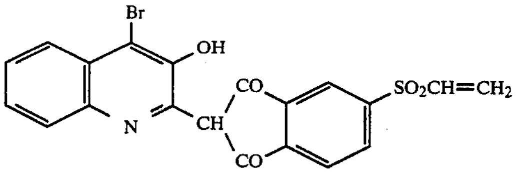

[C] Sublimable Dyes having an Epoxy Group:

The following dyes fall in this category: azo type, anthraquinone type, naphthoquinone type, styrylic, indoaniline type, quinophthalone type, azomethine type and the like sublimable dyes having an epoxy group. That is:

(i) The aforesaid azo type dyes include azo type dyes of the general formula [VIII]:

[VIII]

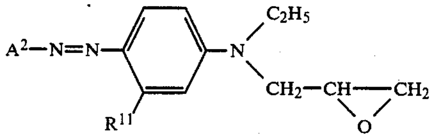

wherein $A^2$ is optionally substituted phenyl, benzothiazolyl, imidazolyl or thienyl, $R^{11}$ is hydrogen, alkyl or alkylcarbonylamino, and $R^{12}$ is alkyl.

Examples of preferred azo type dyes are those of the following structural formulae:

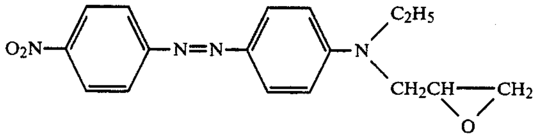

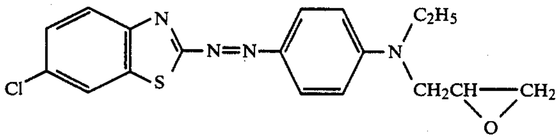

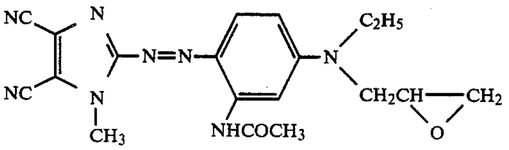

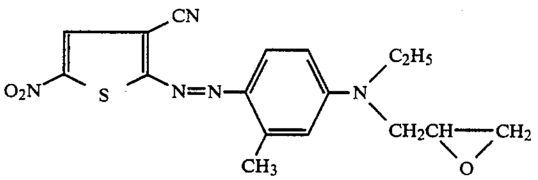

-continued

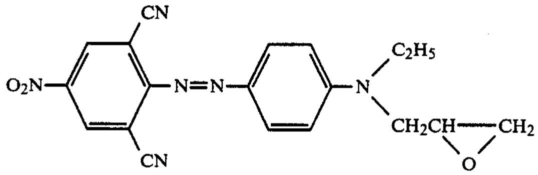

(ii) The aforesaid anthraquinone type dyes include anthraquinone type dyes of the general formula [IX] or [X]:

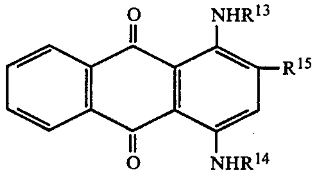

[IX]

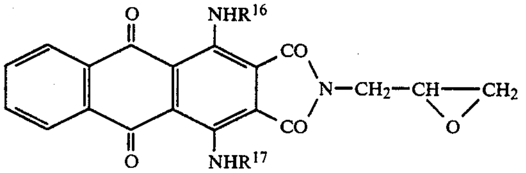

[X]

wherein $R^{13}$ and $R^{14}$ are each hydrogen, alkyl or

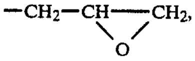

$R^{15}$ is hydrogen or

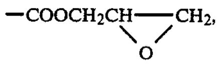

and $R^{16}$ and $R^{17}$ are each hydrogen or alkyl, with the proviso that when $R^{13}$ and $R^{14}$ are both hydrogen or alkyl, the $R^{15}$ is

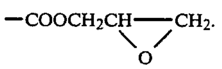

Examples of preferred anthraquinone type dyes are those of the following structural formulae:

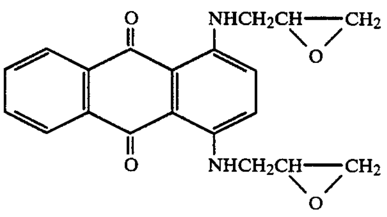

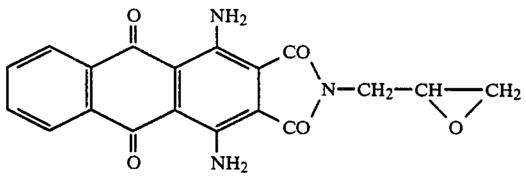

-continued

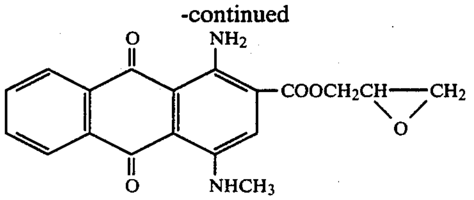

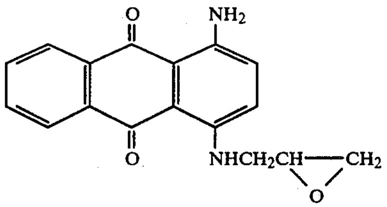

(iii) The aforesaid naphthoquinone type dyes include naphthoquinone type dyes of the general formula [XI] or [XXI]:

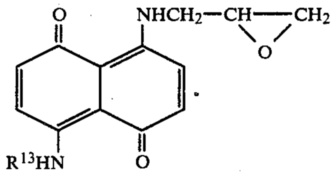

[XI]

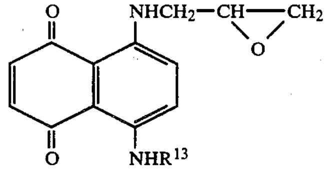

[XXI]

wherein $R^{13}$ is as defined above.

Examples of preferred naphthoquinone type dyes are those of the following structural formulae:

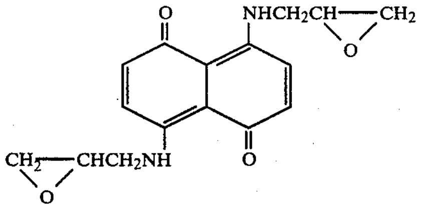

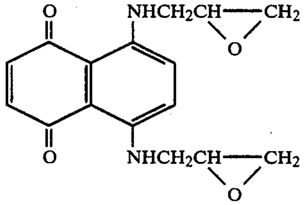

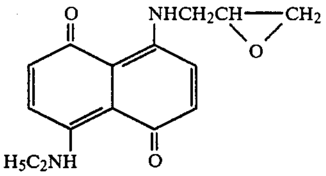

(iv) The aforesaid styrylic dyes include styrylic dyes of the general formula [XII]:

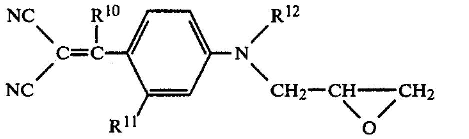

[XII]

wherein $R^{10}$, $R^{11}$ and $R^{12}$ are as defined above.

Examples of preferred styrylic dyes are those of the following structural formulae:

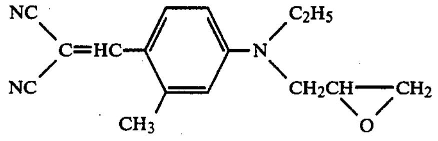

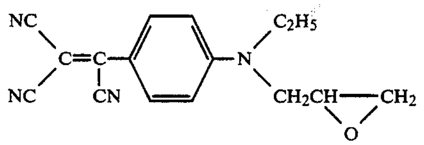

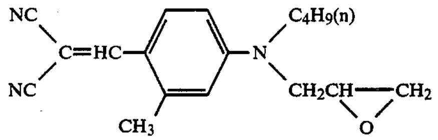

(v) The aforesaid indoaniline type dyes include indoaniline type dyes of the general formula [XIII]:

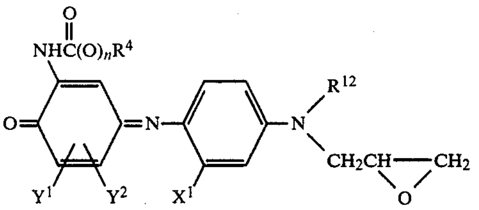

[XIII]

wherein n, $R^4$, $R^{12}$, $Y^1$, $Y^2$ and $X^1$ are as defined above, and indoaniline type dyes of the general formula [XXII]:

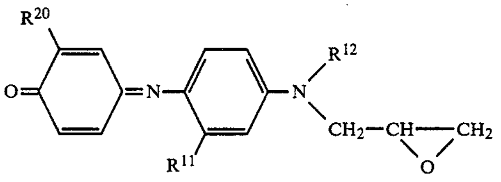

[XXII]

wherein $R^{20}$ is hydrogen or alkylaminocarbonyl,

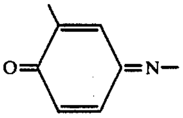
is
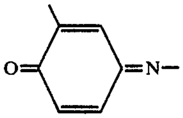
or
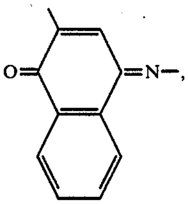
, and $R^{11}$ and $R^{12}$ are as defined above.

Examples of preferred indoaniline type dyes are those of the following structural formulae:

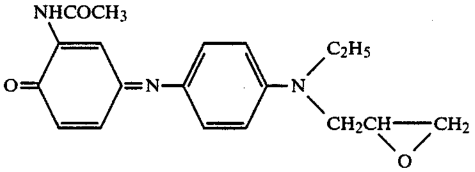

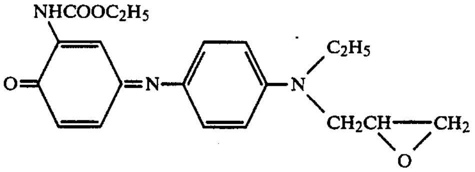

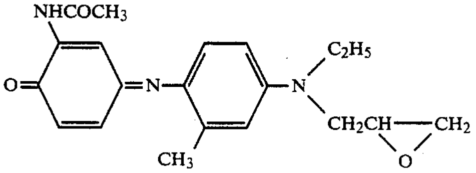

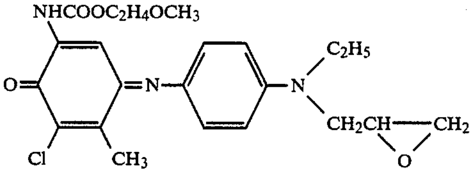

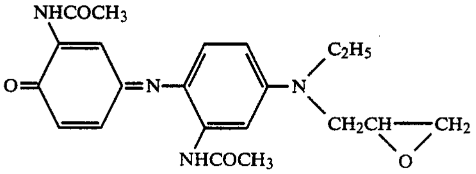

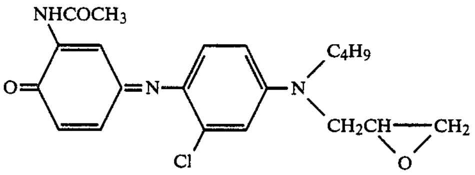

-continued

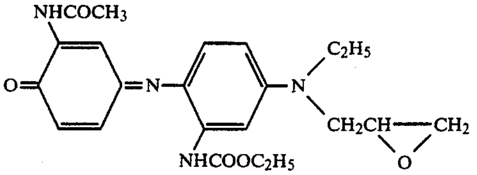

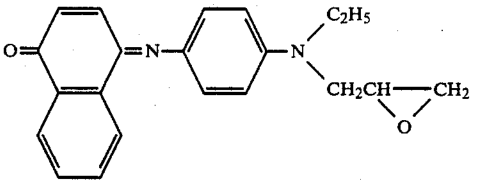

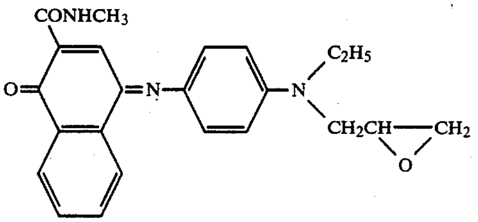

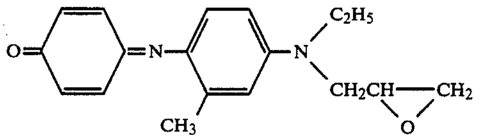

(vi) The aforesaid quinophthalone type dyes include quinophthalone type dyes of the general formula [XXIII]:

[XXIII]

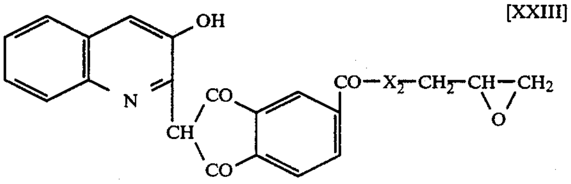

wherein $-X^2-$ is —O— or —NH—.

Examples of preferred quinophthalone type dyes are those of the following structural formulae:

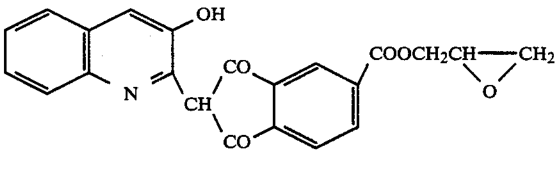

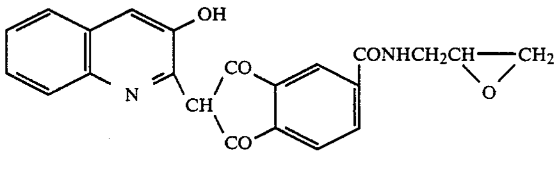

(vii) The aforesaid azomethine type dyes include azomethine type dyes of the general formula [XXIV]:

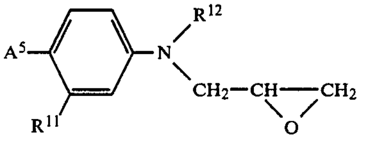

[XXIV]

wherein A is

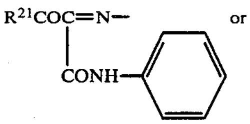

or

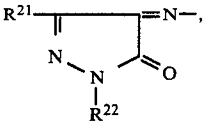

$R^{21}$ and $R^{22}$ are each alkyl, and $R^{11}$ and $R^{12}$ are as defined above.

Examples of preferred azomethine type dyes are those of the following structural formulae:

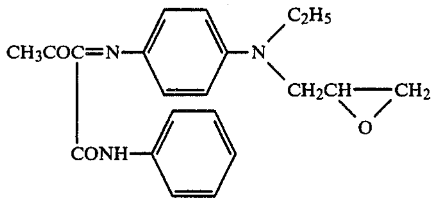

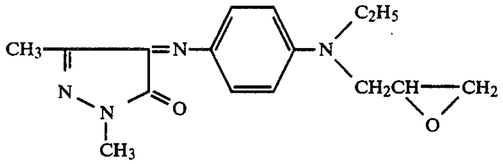

[D] Sublimable Dyes Having an Acryloyl Group or a Methacryloyl Group

The following dyes fall in this category: styrylic, indoaniline type, azo type, anthraquinone type, naphthoquinone type, azomethine type and the like sublimable dyes having an acryloyl group or a methacryloyl group. That is:

(i) The aforesaid styrylic dyes include styrylic dyes of the general formula [XIV]:

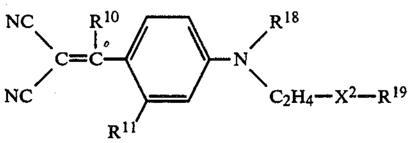

[XIV]

wherein $R^{18}$ is alkyl, $R^{19}$ is acryloyl or methacryloyl, and $R^{10}$, $R^{11}$ and $R^{19}$ are as defined above.

Examples of preferred styrylic dyes are those of the following structural formulae:

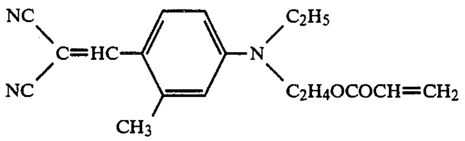

-continued

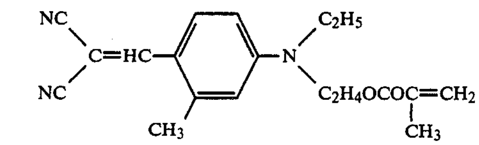

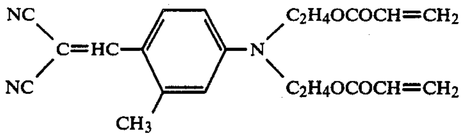

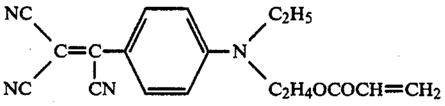

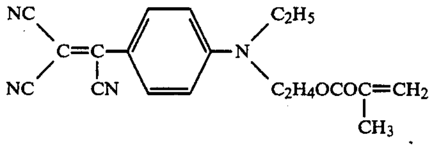

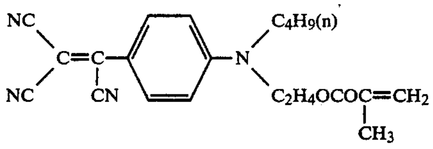

(ii) The aforesaid indoaniline type dyes include indoaniline type dyes of the general formula [XV]:

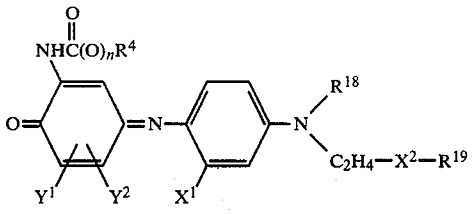

[XV]

wherein n, $R^4$, $R^{18}$, $R^{19}$, $Y^1$, $Y^2$, $X^1$ and $X^2$ are as defined above, and indoaniline type dyes of the general formula [XXV]:

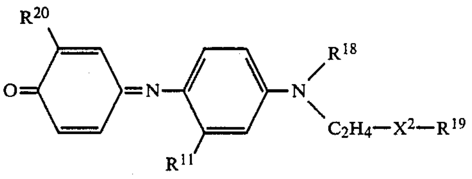

[XXV]

wherein

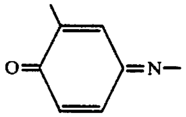 is 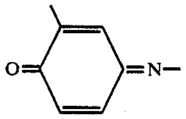 or

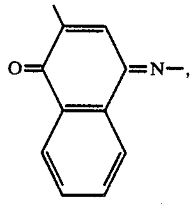, and $R^{11}$, $R^{18}$, $R^{19}$, $R^{20}$ and $X^2$ are as defined above. Examples of preferred indoaniline type dyes are those of the following structural formulae:

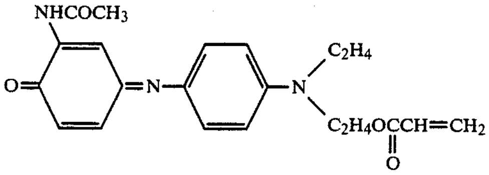

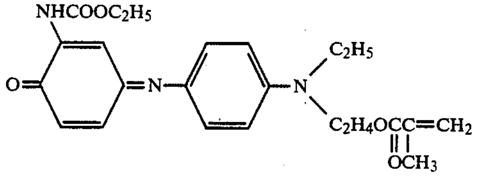

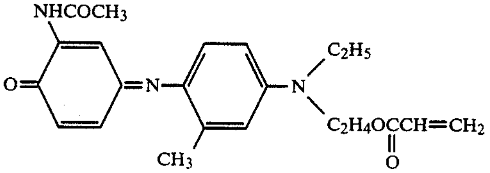

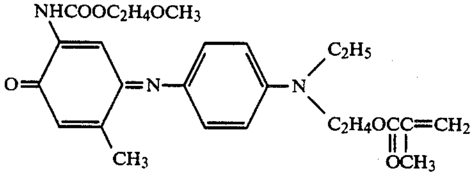

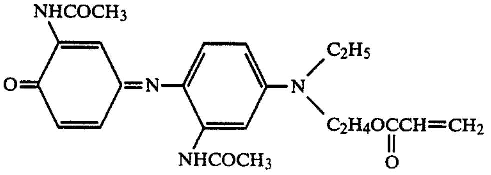

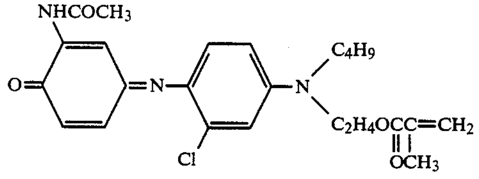

-continued

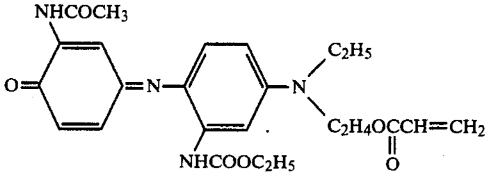

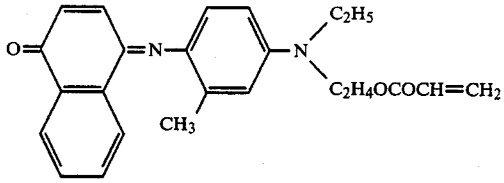

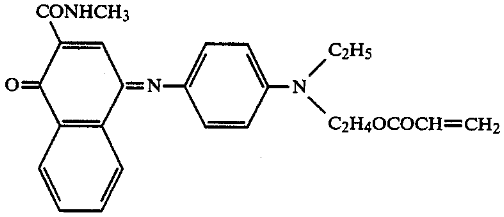

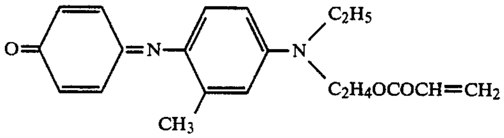

(iii) The aforesaid azo type dyes include azo type dyes of the general formula [XVI]:

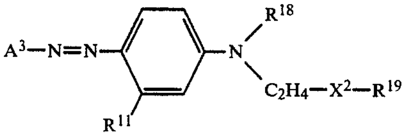

[XVI]

wherein $A^3$ is optionally substituted phenyl, thienyl or thiadiazolyl, and $R^{11}$, $R^{18}$, $R^{19}$ and $X^2$ are as defined above, and azo type dyes of the general formula [XVII]:

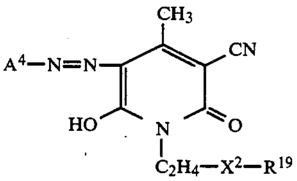

[XVII]

wherein $A^4$ is optionally substituted phenyl, and $R^{19}$ and $X^2$ are as defined above.

Examples of preferred azo type dyes are those of the following structural formulae:

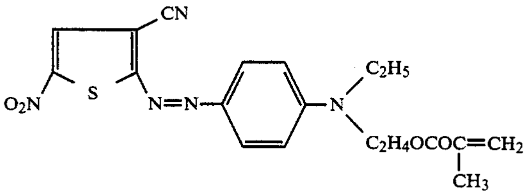

-continued

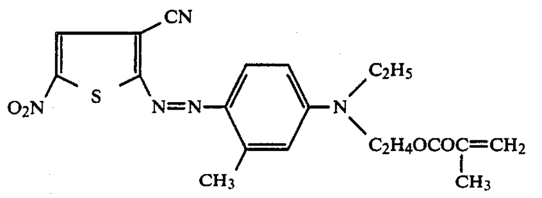

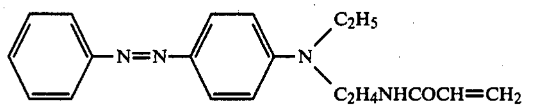

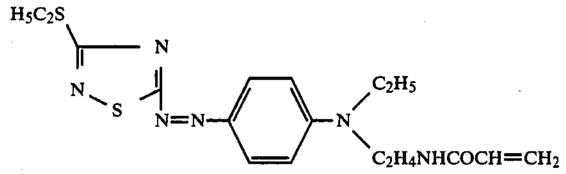

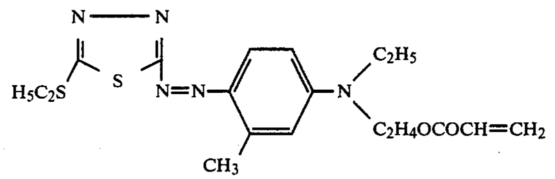

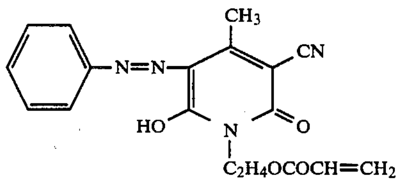

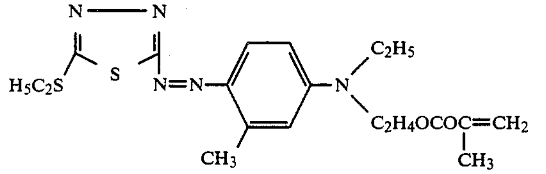

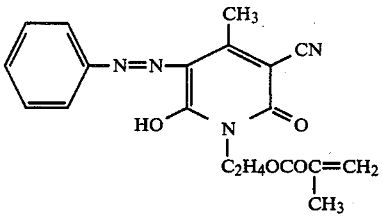

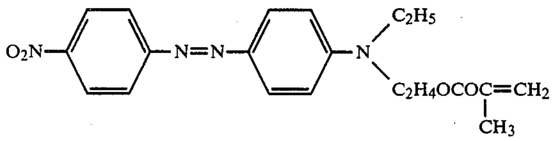

(iv) The aforesaid anthraquinone type dyes include anthraquinone type dyes of the general formula [XXXIII]:

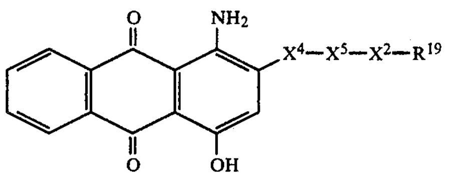

[XXXIII]

wherein $X^5$ is alkylene, and $X^2$, $X^4$ and $R^{19}$ are as defined above, and anthraquinone dyes of the general formula [XXVI]:

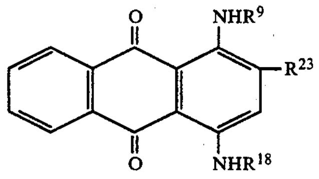

[XXVI]

wherein $R^{23}$ is hydrogen or $—COO—C_2H_4—X^2—R^{19}$, and $R^9$, $R^{18}$ and $X^2$ are as defined above, with the proviso that when $R^{18}$ is alkyl, then $R^{23}$ is $—COO—C_2H_4—X^2—R^{19}$.

Examples of preferred anthraquinone type dyes are those of the following structural formulae:

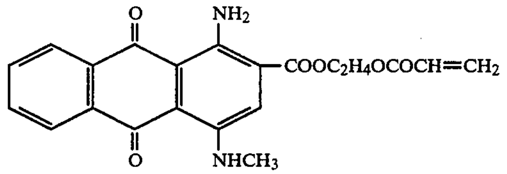

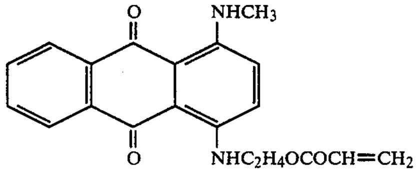

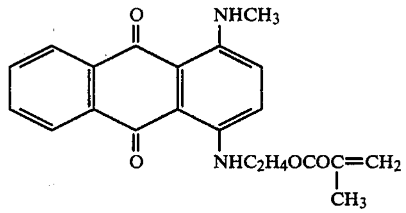

(v) The aforesaid naphthoquinone type dyes include naphthoquinone type dyes of the general formula [XXVIII] or [XXIX]:

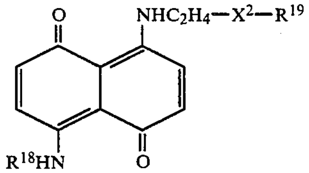

[XXVIII]

-continued

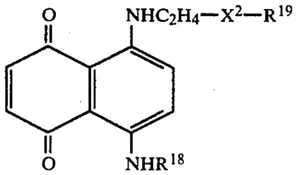

[XXIX]

wherein $R^{18}$, $R^{19}$ and $X^2$ are as defined above.

Examples of preferred naphthoquinone type dyes are those of the following structural formulae:

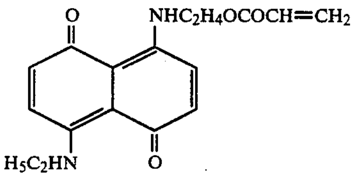

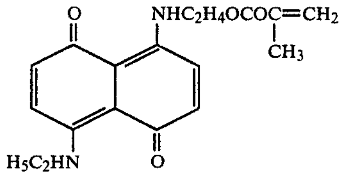

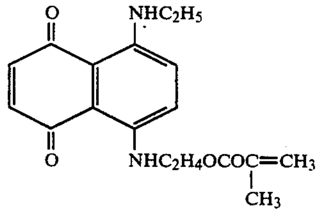

(vi) The aforesaid azomethine type dyes include azomethine type dyes of the general formula [XXX]:

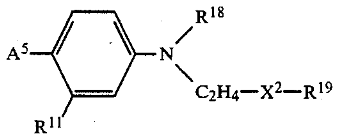

[XXX]

wherein $A^5$, $R^{11}$, $R^{18}$, $R^{19}$ and $X^2$ are as defined above.

Examples of preferred azomethine type dyes are those of the following structural formulae:

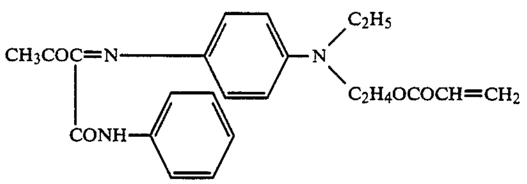

-continued

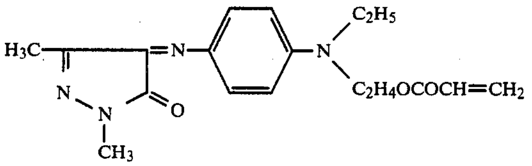

As the resin for preparing the above-described ink, that having a high melting point or softening point is suitable, and specific examples of suitable resins include phenolic resins, melamine resins, urethane resins, epoxy resins, silicone resins, urea resins, diallyl phthalate resins, alkyd resins, acetal resins, acrylic resins, methacrylic resins, polyester resins, starch and derivatives thereof, cellulosic resins, polyvinyl chloride, polyvinylidene chloride, fluorine resins, chlorinated polyethylene, polyethylene, polypropylene, polystyrene, polyvinyl acetal, polyvinyl alcohol, polycarbonates, polysulfones, polyether sulfones, polyethylene terephthalate, polybutylene terephthalate, polyphenylene oxide, polyphenylenesulfinde, polyethylene naphthalate, polyacrylonitrile, polyimides, polyamides, AS resins, ABS resins etc.

Particularly preferred resins are such inert resins as methyl cellulose, polyvinyl alcohol, hydroxypropylmethyl cellulose, hydroxyethyl cellulose, polysulfones, polyether sulfones, polyethylene terephthalate, polycarbonates, ethyl cellulose, cellulose acetate, acrylic resins etc.

Examples of the solvent used for preparing the ink include alcohols such as methanol, ethanol, propanol, butanol etc., cellosolves such as methyl cellosolve, ethyl cellosolve etc., aromatics such as benzene, toluene, xylene, chlorobenzene etc., esters such as ethyl acetate, butyl acetate etc., ketones such as acetone, methyl ethyl ketone, methyl isobutyl ketone, cyclohexanone etc., hydrocarbons such as ligroine, cyclohexane, kerosene etc., chlorine type solvents such as chloroform, methylene chloride, trichloroethylene etc., dimethylformamide etc., and where a water-based resin is used, it is also possible to use water or water in mixture with the above-described solvents.

Particularly preferred solvents are such inert solvents as benzene, toluene, xylene, chlorobenzene, acetone, methyl ethyl ketone, chloroform, methylene chloride etc.

The base for the transfer sheet is suitably tissue paper such as condenser paper, glassin paper etc. or a film of a plastic having good heat resistance, such as polyesters, polyamides and polyimides. Such a base had to be thin in order to increase the heat transfer coefficiency from the heat-sensitive head to the dye etc., and thus a thickness of not greater than 50 μm is suitable, preferably not greater than 20 μm.

The recording sheet used in the transfer recording method of this invention may be obtained by coating an appropriate base, for example, paper, a resin film etc. with a coating solution containing a compound capable of reacting with the sublimable dye contained in the color material layer of the transfer sheet, and then drying to form an image receiving layer.

On that occasion, the coating solution may also contain a resin such as polyesters, polyamides, polyacrylates etc., inorganic fine particles such as silica, alumina, calcium carbonates etc., and the like.

Examples of the compound capable of reacting with the sublimable dye contained in the color material layer of the transfer sheet include the following:

[a] In the Case where the Sublimable Dye Contained in the Color Material Layer of the Transfer Sheet is a Sublimable Dye Capable of Reacting with an Epoxy Group or an Isocyanate Group Described in the Aforesaid [A]:

Compounds having an epoxy group, an isocyanate group or a blocked isocyanate group fall in this category.

(i) The compounds having an epoxy group include various known polymers and monomers containing one or more epoxy groups, and specific examples thereof are those having the following structural formulae:

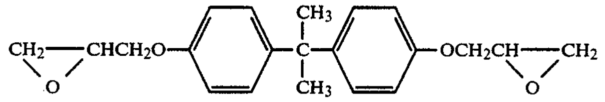

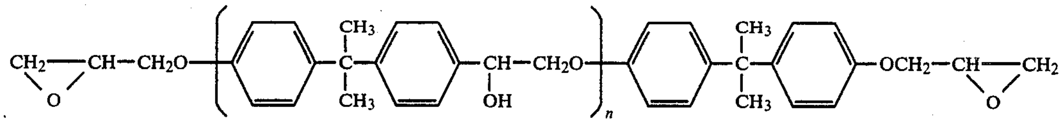

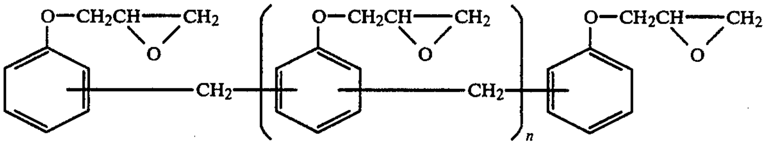

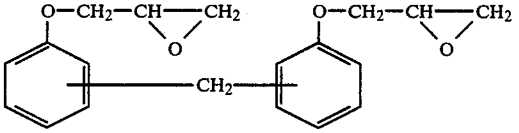

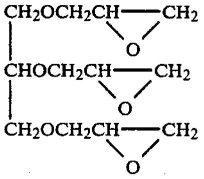

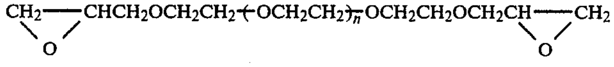

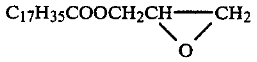

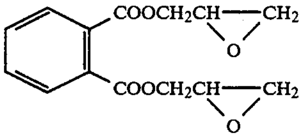

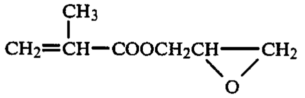

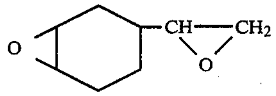

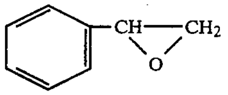

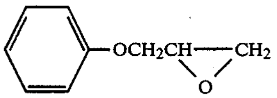

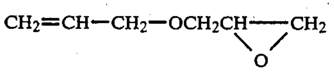

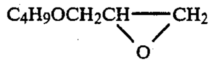

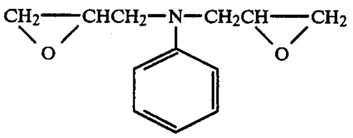

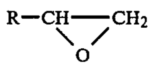 (R = straight-chain alkyl)

(ii) The compounds having an isocyanate group include various known isocyanate compounds, and specific examples thereof are those having the following structural formulae:

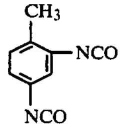

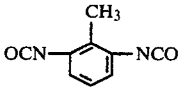

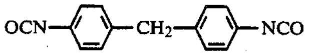

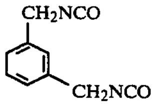

$OCN-(CH_2)_6-NCO$

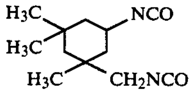

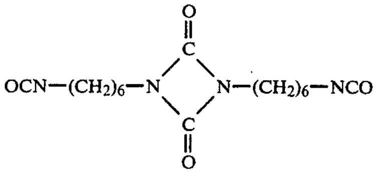

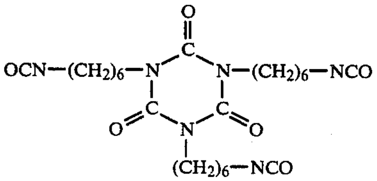

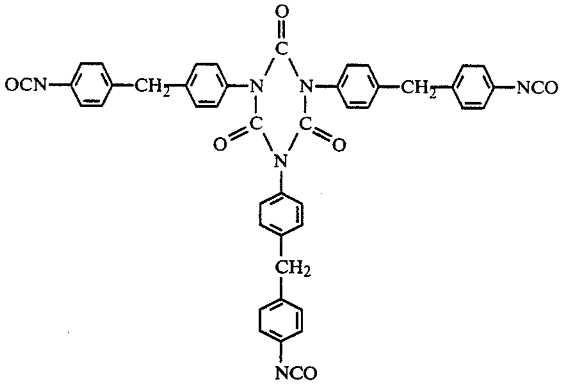

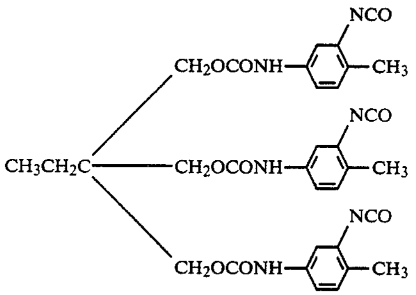

-continued

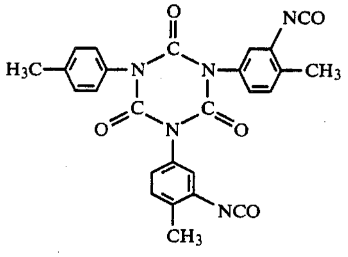

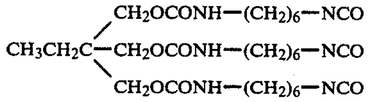

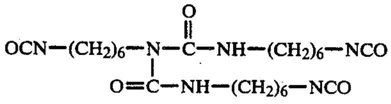

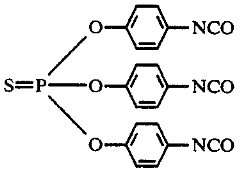

(iii) The compounds having a blocked isocyanate group include those which will produce an isocyanate group upon heating on heat transfer, and specific examples thereof include compounds obtained by inactivating (masking) the above-described isocyanate compounds with ethanol, phenol, cresol, diethyl maleate, ethyl acetoacetate, acetylacetone etc.

[b] In the Case where the Sublimable Dye Contained in the Color Material Layer of the Transfer Sheet is the Sublimable Dye Having a Vinylsulfonyl Group Described in the Aforesaid [B] or the Sublimable Dye Having an Acryloyl Group or a Methacryloyl Group Described in the Aforesaid [D]:

Active hydrogen compounds fall in this category, and include various known polymers and low molecular weight compounds containing e.g. a hydroxyl group, a mercapto group, a carboxyl group, an amino group, a monoalkylamino group, or an amido group, preferably, a hydroxyl group, a carboxyl group or an amino group. Specific examples thereof are the following:

(i) Compounds having an OH group:

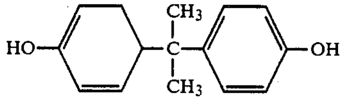

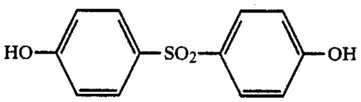

-continued
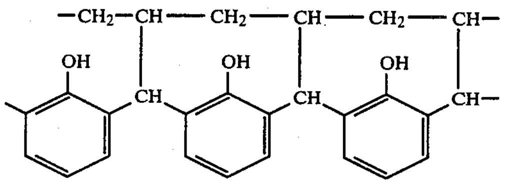
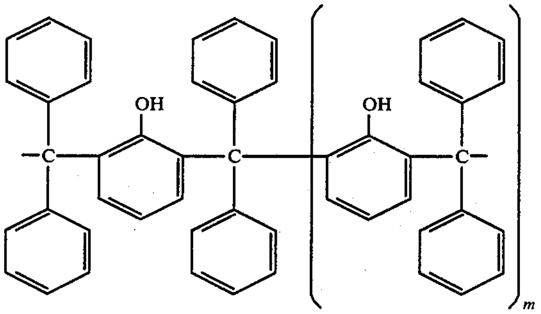
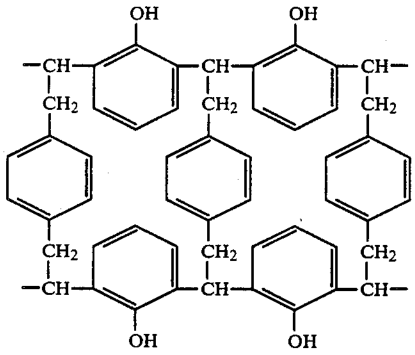
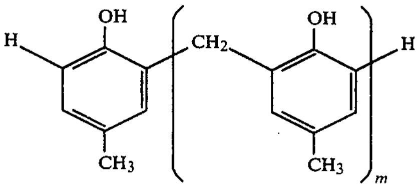
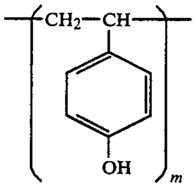
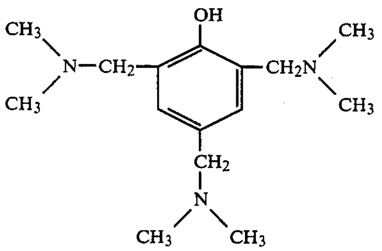
-continued
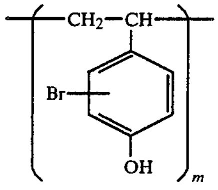
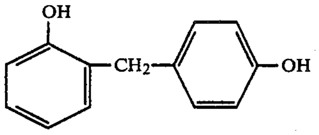
(ii) Compounds having a mercapto group:
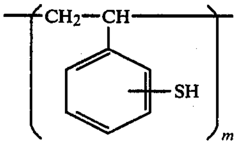
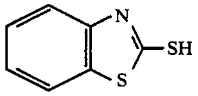
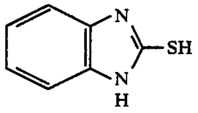
(iii) Compounds having a carboxyl group:
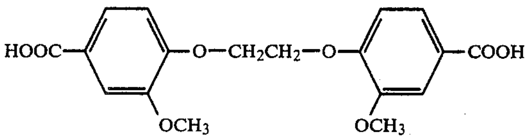
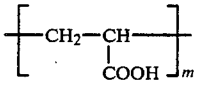
(iv) Compounds having an amino group, a monoalkyl group or an amido group:
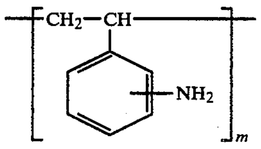
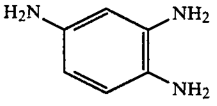
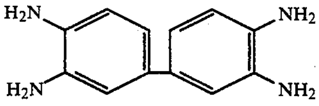

-continued

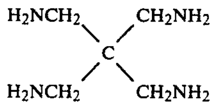

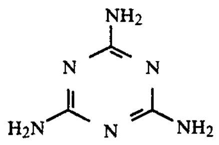

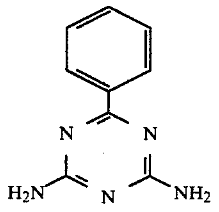

$H_2NCH_2CH_2NH_2$ $H_2NCH_2CH_2NHCH_2CH_2NH_2$ $(CH_3)_2NCH_2CH_2CH_2NH_2$ $HOCH_2CH_2NHCH_2CH_2NHCH_2CH_2OH$

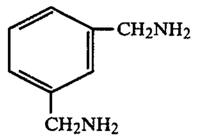

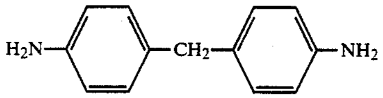

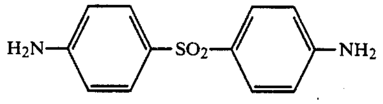

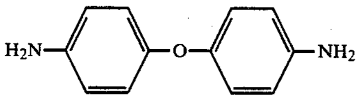

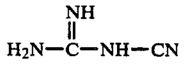

$H_2NNHCO(CH_2)_4CONHNH_2$

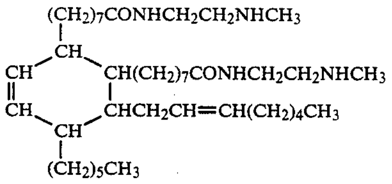

-continued

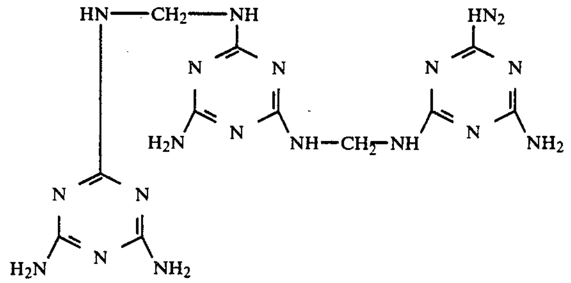

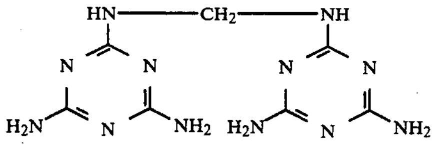

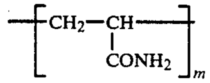

(v) Compounds having various groups:

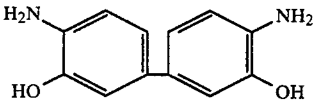

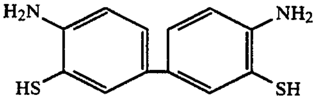

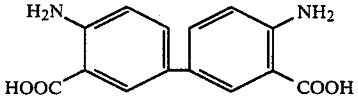

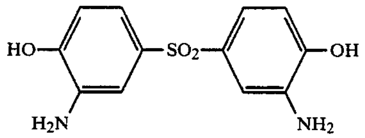

[c] In the Case where the Sublimable Dye Contained in the Color Material Layer of the Transfer Sheet is the Sublimable Dye Having a Epoxy Group Described in the Aforesaid [C]:

The active hydrogen compounds described in the aforesaid [b] or organic acid anhydride fall in this category.

Specific examples of organic acid anhydride include the following:

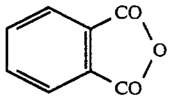

-continued

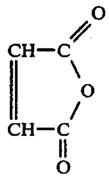

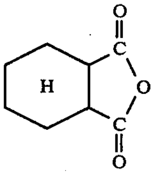

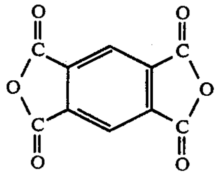

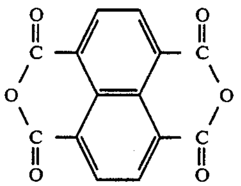

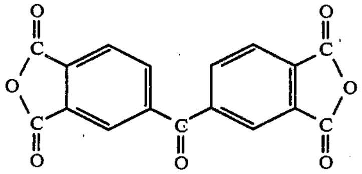

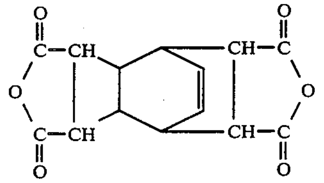

Heat-sensitive transfer recording using the transfer sheet and recording sheet obtained above may be effected by overlapping both in such way that the color material of the transfer sheet and the image receiving layer of the recording sheet be inside, and heating and pressing the assembly from the back side of the transfer sheet using a heat-sensitive recording head.

Where transfer recording is conducted by the above-described method, since the dye in the transfer sheet is not only sublimed and transferred to the recording sheet but also reacts with the compound capable of reacting therewith in the recording sheet, the fixation of the dye is ensured, thereby giving recording having excellent storage stability.

As evident from the preceding description and the examples described hereinbelow, recording having excellent storage stability may be readily and simply obtained by this invention.

This invention is more particularly described by the following examples and preparation examples, but it will be noted that these examples are merely illustrative and do not restrict this invention.

EXAMPLE 1

(1) Process for the Preparation of a Transfer Sheet

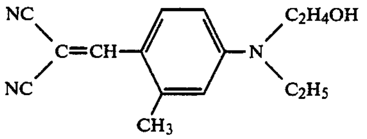

| | |
|---|---|
| Sublimable dye having the above structural formula | 2 g |
| Ethyl cellulose | 8 g |
| Isopropanol | 90 g |
| Total | 100 g |

A mixture having the above composition was mixed and conditioned with glass beads using a paint conditioner for about 30 minutes to prepare an ink.

The above ink was coated on a condenser paper sheet (10 μm in thickness) using a gravure printer (30 μm in block depth) and thereafter dried in air to prepare a transfer sheet.

(2) Process for the Preparation of a Recording Sheet

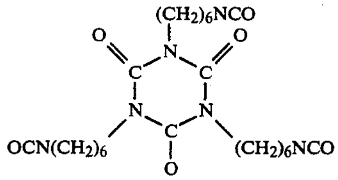

| | |
|---|---|
| Isocyanate compound having the above structural formula | 5 g |
| Polyester resin* | 15 g |
| Methyl ethyl ketone | 80 g |
| Total | 100 g |

*"VYLON 200" (tradename) produced by Toyo Spinning Co., Ltd.

The above composition was mixed to prepare a coating solution.

The above obtained coating solution was coated on a wood free paper sheet using a gravure printer (30 μm in block depth) and dried in air to prepare a recording sheet.

(3) Method of Transfer Recording The aforesaid transfer sheet was overlapped with the recording sheet with the ink coated surface of the former and the coating solution coated surface of the latter inside, and heated from the back surface of the transfer sheet using a heat-sensitive head, thereby recording in a brilliant deep yellow color was successfully obtained on the recording sheet.

In order to test the stability of the recording thus obtained, the recorded surface was overlapped with a wood free paper sheet and maintained under pressure of 200 g/cm$^2$ at 80° C. for 24 hours, and as a result, there was hardly observed any change in the color of the record or any staining on the wood free paper sheet due to the dye.

REFERENCE EXAMPLE 1

(Synthesis of the Dye of Example 1)

62.1 g of a compound of the following structural formula:

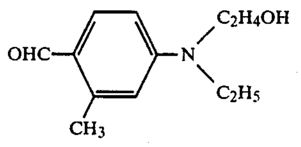

was dissolved in 420 ml of IPA (isopropyl alcohol), 19.8 g of malonitrile and 1.5 ml of piperidine were added thereto, then the mixture was heated to 80° C. and reacted at 80° C. for 2 hours. After cooling, methanol was added, the precipitated crystals were filtered, washed with water and dried to obtain 62 g of yellow crystals.

The obtained dye had a maximum absorption wavelength (λmax: chloroform) of 448 nm.

COMPARATIVE EXAMPLE 1

(1) Process for the Preparation of a Transfer Sheet

A transfer sheet was prepared in a manner similar to that in Example 1.

(2) Process for the Preparation of a Recording Sheet

A coating solution was prepared by dissolving 15 g of a polyester resin (VYLON 200) in 85 g of methyl ethyl ketone, and coated on a wood free paper sheet in a manner similar to that in Example 1 to prepare a recording sheet.

(3) Method of Transfer Recording

The aforesaid transfer sheet and recording sheet were overlapped and transfer recording was conducted in a manner similar to that in Example 1 to obtain a record in a deep yellow color.

The thus obtained recording was tested for stability in a manner similar to that in Example 1, and, as a result, it was observed that the overlapped wood free paper sheet had been remarkably stained due to the migration of the dye from the recording sheet. Further, the color density of the recording sheet was remarkably reduced due to the migration of the dye.

EXAMPLE 2

A transfer sheet was prepared by using a sublimable dye of the structural formula:

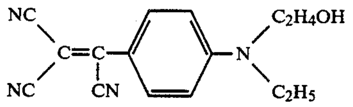

instead of the sublimable dye used in Example 1, and a recording sheet was prepared by using an epoxy compound of the structural formula:

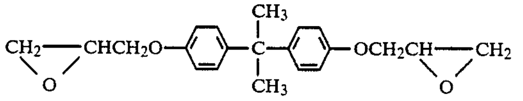

instead of the isocyanate compound used in Example 1, and thereafter transfer recording was conducted in a manner similar to that in Example 1 to obtain a record in a brilliant deep red color. This record was tested for stability in a manner similar to that in Example 1, and as a result, there was hardly observed any change in the color of the record or any staining of the wood free paper due to the dye.

REFERENCE EXAMPLE 2

(Synthesis of the Dye of Example 2)

6.1 g of a compound of the structural formula:

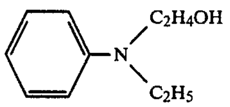

was dissolved in 15 ml of N,N-dimethylformamide, then 3.8 g of tetracyanoethylene was gradually added thereto, and stirred at 40°-50° C. for 2 hours. After cooling, 100 ml of a 90% methanolic aqueous solution was added, and the precipitates were filtered off. They were washed with methanol and then with water, and dried to obtain 5.2 g of dark red crystals.

The obtained dye had a melting point of 162°-168° C. and a maximum absorption wavelength (λmax: chloroform) of 521 nm.

COMPARATIVE EXAMPLE 2

Using the transfer sheet prepared in Example 2 and a recording sheet prepared in a manner similar to that in Example 2 except that the epoxy compound used in Example 2 was not used, transfer recording and a test on the recording stability were conducted similarly, and as a result, there were observed a remarkable reduction in the color density and remarkable staining of the overlapped paper due to the dye.

EXAMPLE 3

A transfer sheet was prepared by using a sublimable dye of the structural formula:

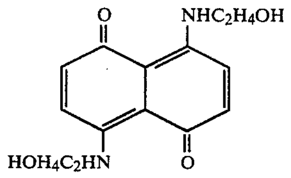

instead of the sublimable dye used in Example 1, and a recording sheet was prepared by using a blocked isocyanate compound of the structural formula:

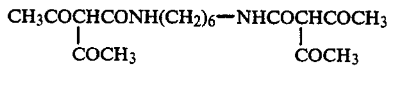

instead of the isocyanate compound used in Example 1, and thereafter transfer recording was conducted in a manner similar to that in Example 1 to obtain a record in a brilliant deep blue color. This record was tested for stability in a manner similar to that in Example 1, and as a result, there were hardly observed any change in the color of the record or any staining of the overlapped wood free paper sheet due to the dye.

REFERENCE EXAMPLE 3

(Synthesis of the Dye of Example 3)

Nitrogen gas was adequately blown into 90 ml of methanol, 30 g of a compound of the structural formula:

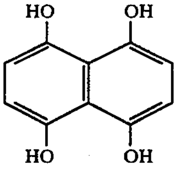

was added thereto, the mixture was cooled to 30° C. or below, 2.10 g of hydroxyethylamine was added thereto and reacted at 40° C. for 2 hours and then at 60° C. for an hour, after which 90 ml of NMP (N-methylpyrrolidone) was added, the mixture was cooled to room temperature, and stirred at room temperature while slowly passing air for 5 hours thereby effecting oxidation. The precipitated crystals were filtered off to obtain 23.0 g of dark blue crystals.

The obtained dye had a maximum absorption wavelength (λmax: chloroform) of 650 nm.

COMPARATIVE EXAMPLE 3

Using the transfer sheet prepared in Example 3 and a recording sheet prepared in a manner similar to that in Example 3 except that the blocked isocyanate compound was not used, transfer recording and a test on the recording stability were conducted, and as a result, there were observed a remarkable reduction in the color density and remarkable staining of the overlapped wood free paper sheet due to the dye.

EXAMPLE 4

Using various sublimable dyes of the structural formulae set forth in Table 1 synthesized according to Reference Examples 1-3 instead of the sublimable dye used in Example 1, transfer sheets were prepared, and transfer recording was conducted in a manner similar to that in Example 1, thereby it was possible to obtain records having good stability, respectively.

TABLE 1

| No. | Dye | Color of the Record | Max. Absorption Wavelength λmax (chloroform) (nm) |
|---|---|---|---|
| 1 | 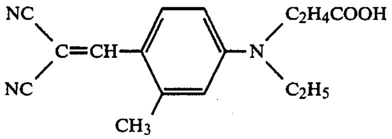 | Yellow | 444 |
| 2 | 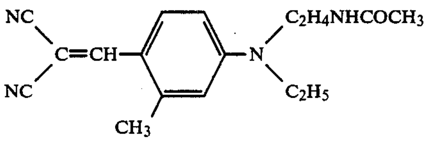 | Yellow | 446 |
| 3 | 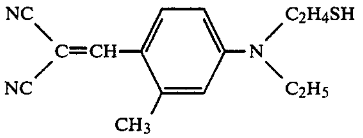 | Yellow | 448 |
| 4 | 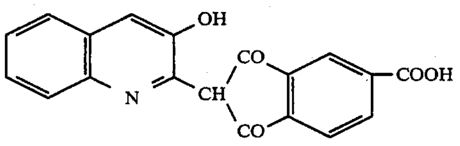 | Yellow | 448 |
| 5 | 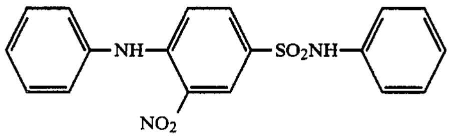 | Yellow | 412 |
| 6 | 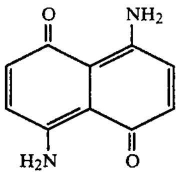 | Blue | 650 |

TABLE 1-continued
| No. | Dye | Color of the Record | Max. Absorption Wavelength λmax (chloroform) (nm) |
|---|---|---|---|
| 7 | 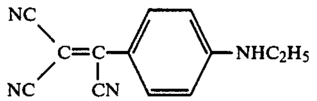 | Yellow | 505 |
| 8 | 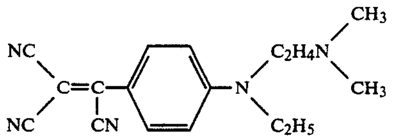 | Red | 520 |
| 9 | 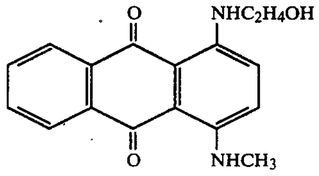 | Blue | 595 |
| 10 | 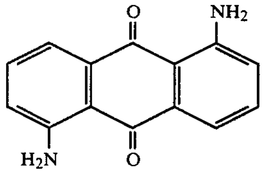 | Red | 540 |
| 11 | 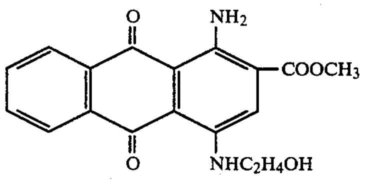 | Blue | 671 |
| 12 | 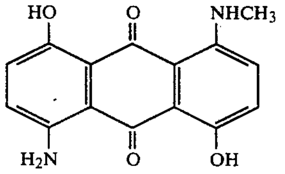 | Blue | 625 |
| 13 | 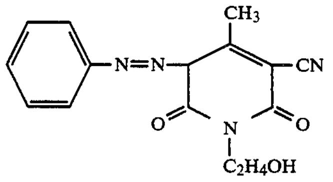 | Yellow | 438 |
| 14 | 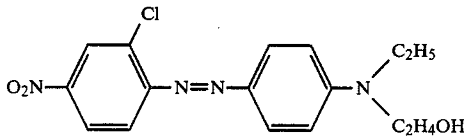 | Red | 496 |
| 15 | 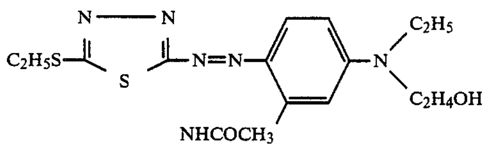 | Red | 530 |

TABLE 1-continued
| No. | Dye | Color of the Record | Max. Absorption Wavelength λmax (chloroform) (nm) |
|---|---|---|---|
| 16 | 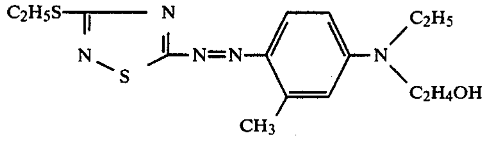 | Red | 515 |
| 17 | 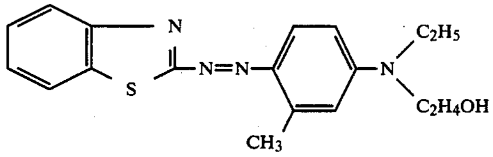 | Red | 493 |
| 18 | 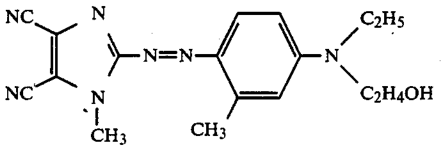 | Red | 521 |
| 19 | 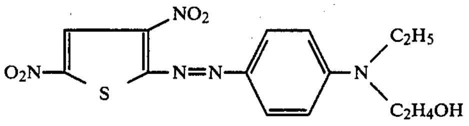 | Blue | 643 |
| 20 | 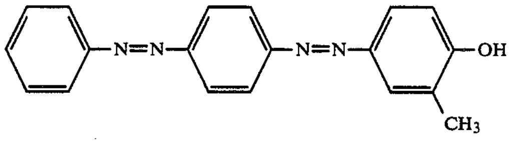 | Yellow | 430 |
| 21 | 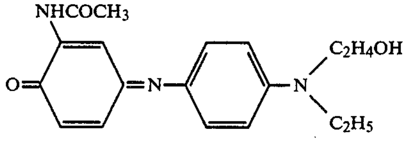 | Blue | 633 |
| 22 | 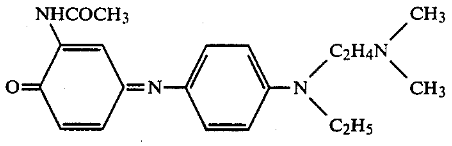 | Blue | 633 |
| 23 | 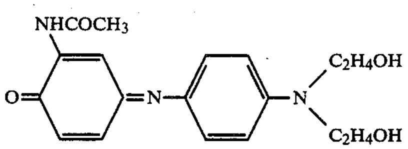 | Blue | 626 |
| 24 | 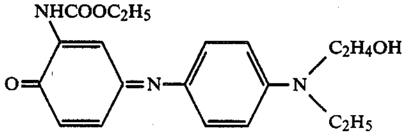 | Blue | 627 |
| 25 | 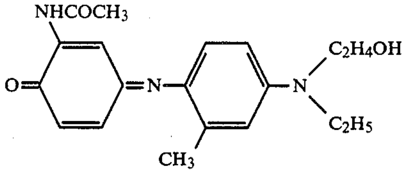 | Blue | 652 |

TABLE 1-continued

| No. | Dye | Color of the Record | Max. Absorption Wavelength λmax (chloroform) (nm) |
| --- | --- | --- | --- |
| 26 | 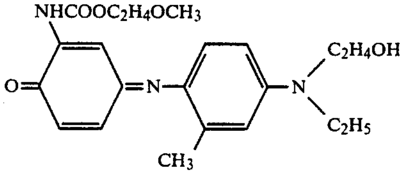 | Blue | 646 |
| 27 | 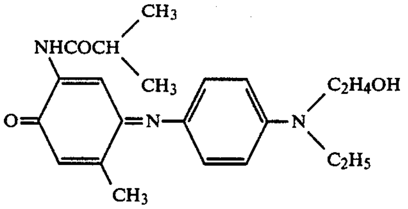 | Blue | 635 |

EXAMPLE 5

A transfer sheet was prepared by using a sublimable dye of the structural formula:

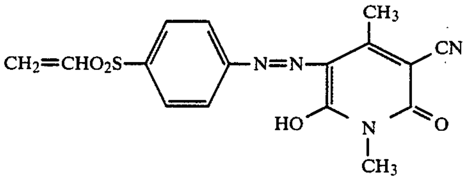

instead of the sublimable dye used in Example 1, and a recording sheet was prepared by using an active hydrogen compound of the structural formula:

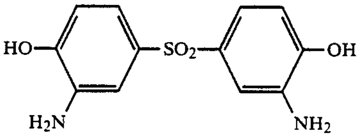

instead of the isocyanate compound used in Example 1, and thereafter transfer recording was conducted in a manner similar to that in Example 1 to obtain a record in a brilliant deep yellow color. This record was tested for stability in a manner similar to that in Example 1, and as a result, there were hardly any change in the color of the record or any staining of the wood free paper sheet due to the dye.

REFERENCE EXAMPLE 4

(Synthesis of the Dye of Example 5)

1.83 g of the compound of the structural formula:

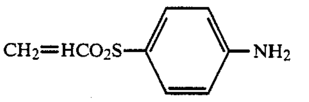

was suspended in 50 ml of water, dissolved therein by adding 4 ml of conc. hydrochloric acid and cooled, after which 0.83 g of sodium nitrite was added thereto and stirred at 0°-5° C. for 4 hours. This diazo solution was poured into a mixture of 1.64 g of a compound of the structural formula:

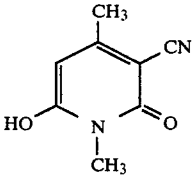

200 ml of methanol, 2 g of urea, 10 g of sodium acetate and 80 g of ice. The mixture was stirred until reaching room temperature, filtered, washed with water and dried to obtain a dye of the structural formula:

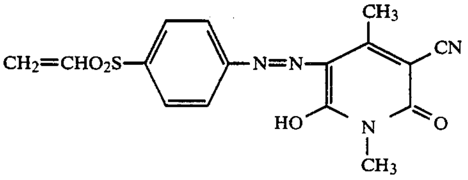

[λmax (chloroform): 445 nm]

COMPARATIVE EXAMPLE 4

Using the transfer sheet prepared in Example 5 and a recording sheet prepared in a manner similar to that in Example 5 except that the active hydrogen compound was not used, transfer recording and a test on the recording stability were conducted, and as a result, the overlapped wood free paper sheet was remarkably stained in a yellow color due to the migration of the dye from the recording sheet and also the color density of the recording sheet was remarkably reduced due to the migration of the dye.

EXAMPLE 6

Transfer recording was conducted in a manner similar to that in Example 5 except that the dye used in Example 5 was replaced by various dyes of the structural formulae set forth in Table 2, thereby it was possible to obtain records having good storage stability, respectively.

TABLE 2
| No. | Dye | Color of the Record | Max. Absorption Wavelength (λmax) (chloroform) (nm) |
|---|---|---|---|
| 1 | 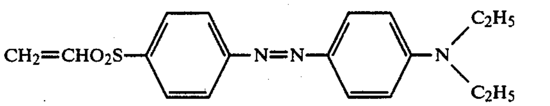 | Yellow | 460 |
| 2 | 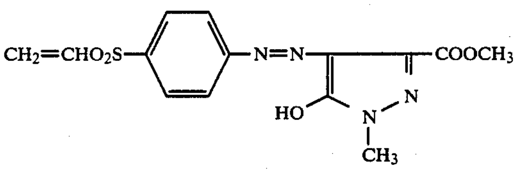 | Yellow | 420 |
| 3 | 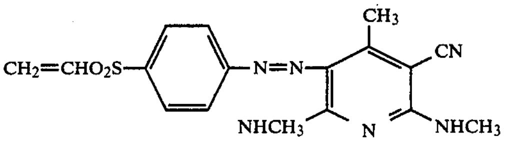 | Red | 510 |
| 4 | 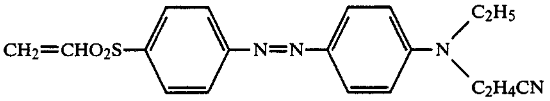 | Yellow | 470 |
| 5 | 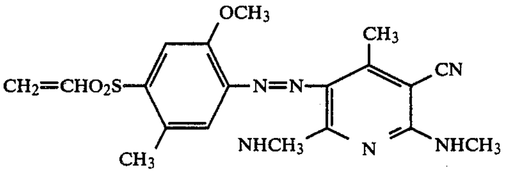 | Red | 519 |
| 6 | 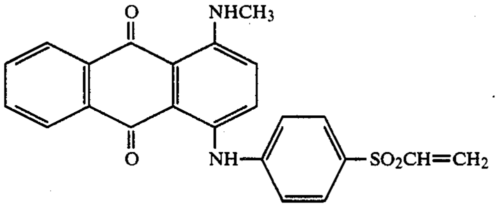 | Blue | 660 |
| 7 | 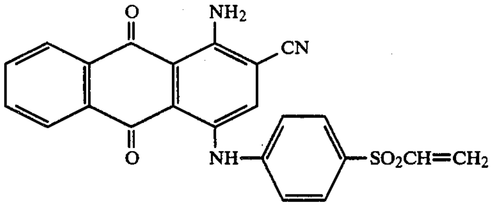 | Blue | 662 |
| 8 | 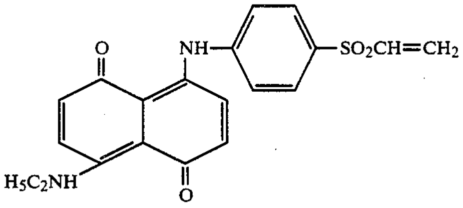 | Blue | 658 |

TABLE 2-continued
| No. | Dye | Color of the Record | Max. Absorption Wavelength (λmax) (chloroform) (nm) |
|---|---|---|---|
| 9 | 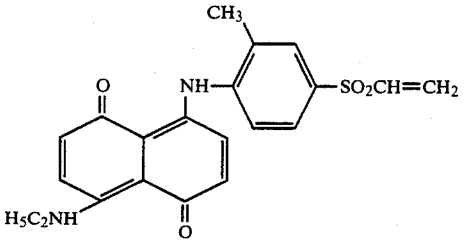 | Blue | 650 |
| 10 | 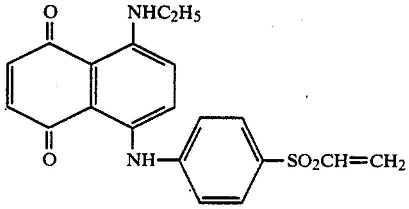 | Blue | 686 |
| 11 | 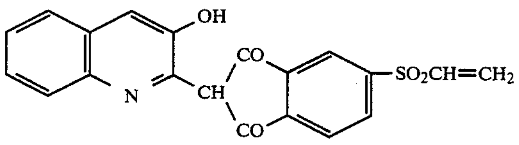 | Yellow | 446 |
| 12 | 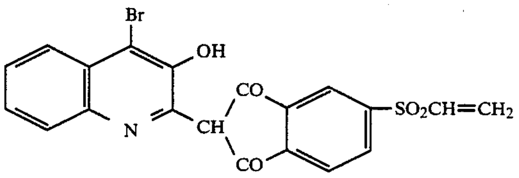 | Yellow | 448 |
| 13 | 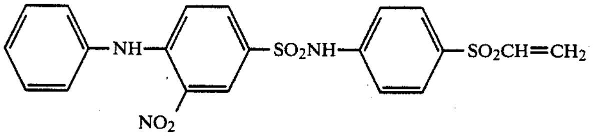 | Yellow | 412 |
| 14 | 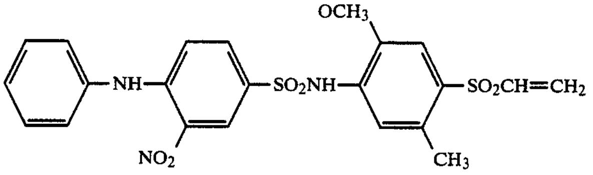 | Yellow | 413 |
| 15 | 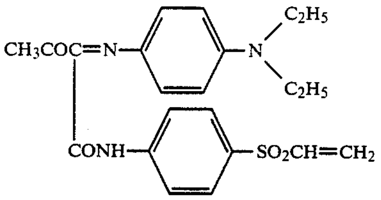 | Yellow | 445 |

TABLE 2-continued

| No. | Dye | Color of the Record | Max. Absorption Wavelength (λmax) (chloroform) (nm) |
|---|---|---|---|
| 16 | 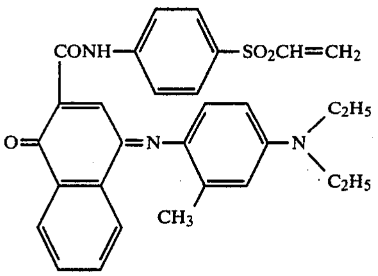 | Blue | 710 |

EXAMPLE 7

Using a transfer sheet prepared by using a sublimable dye of the structural formula:

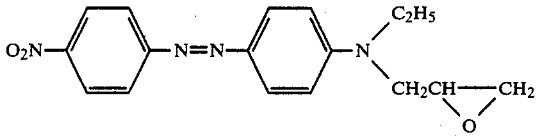

instead of the sublimable dye used in Example 1 and the recording sheet prepared in Example, transfer recording was conducted in a manner similar to that in Example 1 to obtain a record in a brilliant deep orange color. This record was tested for stability in a manner similar to that in Example 1, and as a result, there were hardly observed any change in the color of the record or any staining of the overlapped wood free paper sheet due to the dye.

REFERENCE EXAMPLE 5

(Synthesis of the Dye of Example 7)

14 g of N-ethylaniline, 14.8 g of epichlorohydrin, 10 ml of water and 15 ml of ethanol were added, and reacted with stirring on a water bath for 3 hours. After cooling, the mixture was separated by a separatory funnel, and dried with sodium sulfate.

21 g of the obtained N-ethyl-N-(2-oxy-3-chloropropyl)aniline was cooled with ice during which 8 ml of a 50% sodium hydroxide aqueous solution was gradually added thereto with stirring. Thereafter, stirring was continued for 4 hours, the formed sodium chloride was filtered out, the organic layer was washed with water, and dehydrated with sodium sulfate.

The obtained N-ethyl-N-glycidylaniline and the diazo solution of p-nitroaniline were coupled to obtain a dye of the structural formula:

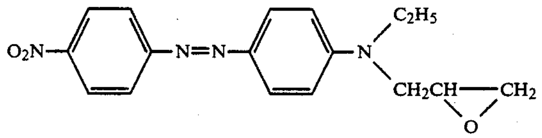

m.p. 159°-162° C.
Mass spectrum M+ 326.
λmax (chloroform) 474 nm.

COMPARATIVE EXAMPLE 5

Using the transfer sheet prepared in Example 7 and a recording sheet prepared in a manner similar to that in Example 5 except that the active hydrogen compound was not used, transfer recording and a test on the recording stability were conducted, and as a result, the overlapped wood free paper sheet was remarkably stained in an orange color due to the migration of the dye from the recording sheet and also the color density of the recording sheet was remarkably reduced due to the migration of the dye.

EXAMPLE 8

Transfer recording was conducted in a manner similar to that in Example 7 except that the dye used in Example 7 was replaced by various dyes of the structural formulae set forth in Table 3, thereby it was possible to obtain records having good storage stability, respectively.

TABLE 3

| No. | Dye | Color of the Record | Max. Absorption Wavelength λmax (chloroform) (nm) |
|---|---|---|---|
| 1 | 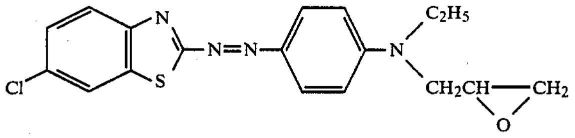 | Red | 490 |

TABLE 3-continued
| No. | Dye | Color of the Record | Max. Absorption Wavelength λmax (chloroform) (nm) |
|---|---|---|---|
| 2 | 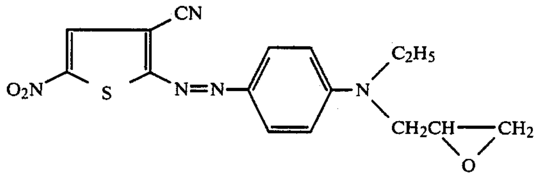 | Blue | 620 |
| 3 | 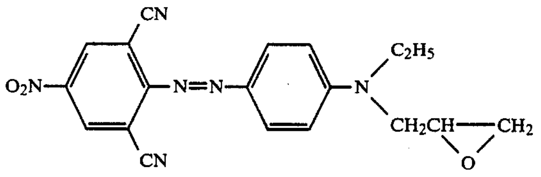 | Blue | 610 |
| 4 | 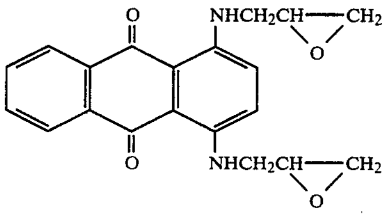 | Blue | 650 |
| 5 | 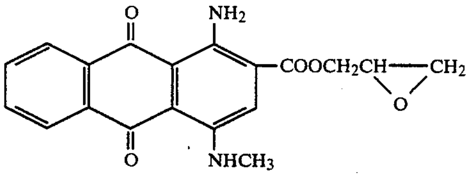 | Blue | 671 |
| 6 | 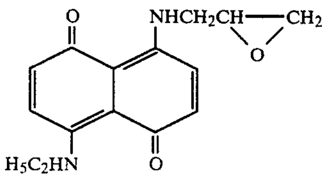 | Blue | 650 |
| 7 | 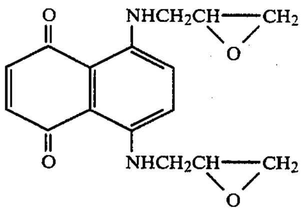 | Blue | 684 |
| 8 | 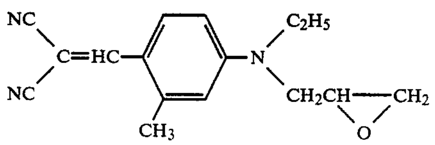 | Yellow | 445 |
| 9 | 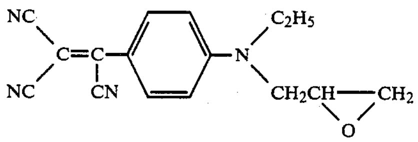 | Red | 520 |

TABLE 3-continued
| No. | Dye | Color of the Record | Max. Absorption Wavelength λmax (chloroform) (nm) |
|---|---|---|---|
| 10 | 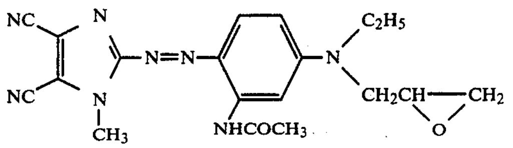 | Red | 535 |
| 11 | 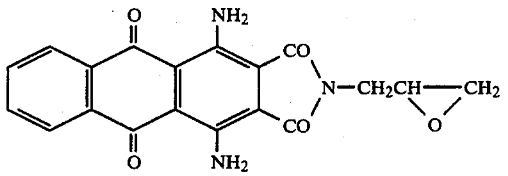 | Blue | 670 |
| 12 | 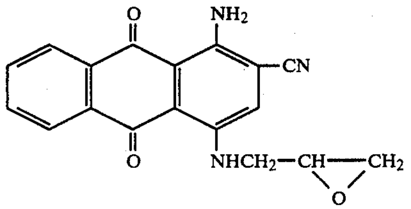 | Blue | 660 |
| 13 | 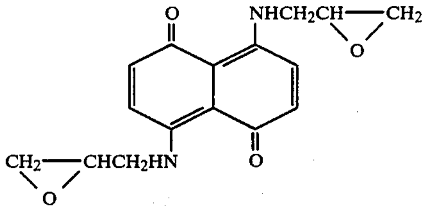 | Blue | 650 |
| 14 | 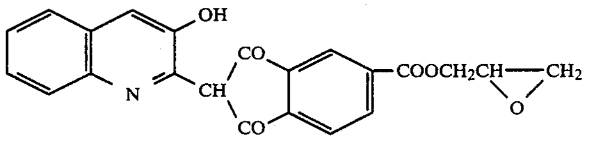 | Yellow | 446 |
| 15 | 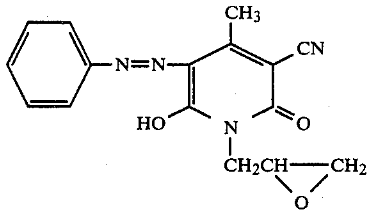 | Yellow | 440 |
| 16 | 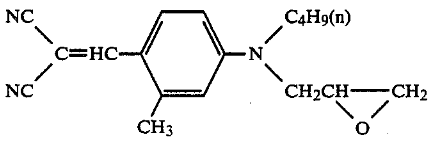 | Yellow | 447 |
| 17 | 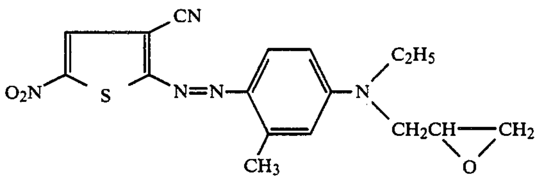 | Blue | 650 |

TABLE 3-continued
| No. | Dye | Color of the Record | Max. Absorption Wavelength λmax (chloroform) (nm) |
|---|---|---|---|
| 18 | 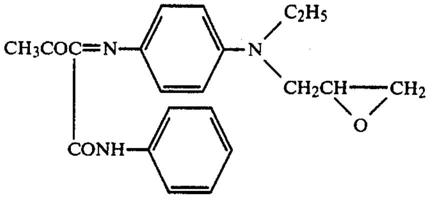 | Yellow | 445 |
| 19 | 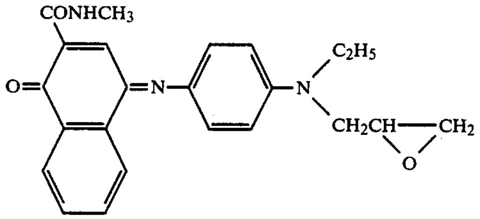 | Blue | 690 |
| 20 | 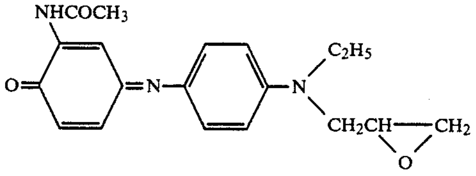 | Blue | 635 |
| 21 | 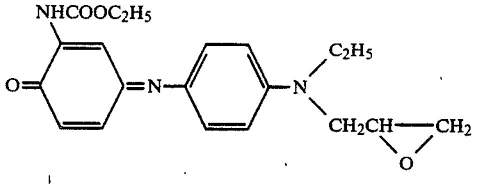 | Blue | 635 |
| 22 | 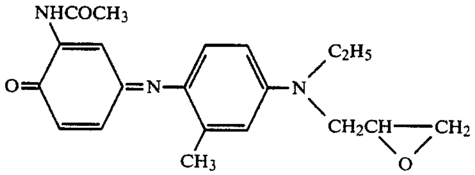 | Blue | 654 |
| 23 | 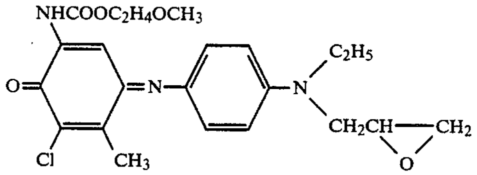 | Blue | 629 |
| 24 | 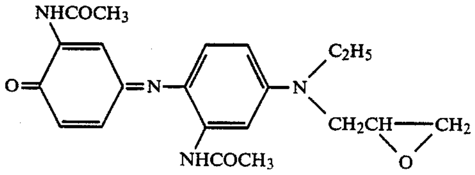 | Blue | 655 |
| 25 | 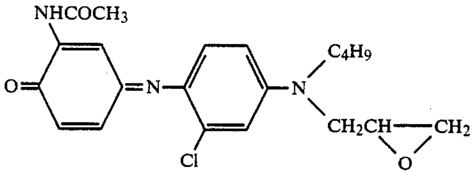 | Blue | 626 |

TABLE 3-continued

| No. | Dye | Color of the Record | Max. Absorption Wavelength λmax (chloroform) (nm) |
|---|---|---|---|
| 26 | 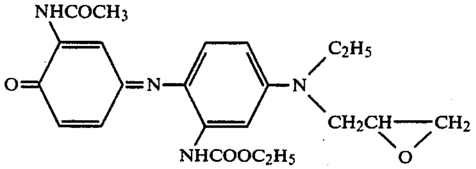 | Blue | 647 |

EXAMPLE 9

Using a transfer sheet prepared by using a sublimable dye of the structural formula:

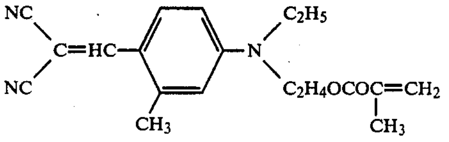

instead of the sublimable dye used in Example 1 and the recording sheet prepared in Example 5, transfer recording was conducted in a manner similar to that in Example 1 to obtain a record in a brilliant deep yellow color. This record was tested for stability in a manner similar to that in Example 1, and as a result, there was hardly observed any change in the color of the record or any staining of the wood free paper sheet due to the dye.

REFERENCE EXAMPLE 6

(Synthesis of the Dye of Example 9)

2.55 g of a compound of the structural formula:

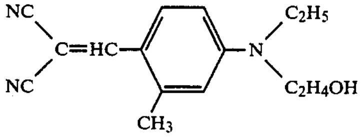

was dissolved in 100 ml of acetone, 1.21 g of triethylamine was added thereto and cooled with ice. Thereafter, 1.25 g of methacryloyl chloride was added dropwise thereto at 0° C., and, after completion of the addition, the mixture was stirred at the same temperature for 2 hours and then at room temperature for 2 hours. The reaction mixture was poured into 200 ml of ice water to precipitate crystals, which were then filtered off and dried to obtain a dye of the structural formula:

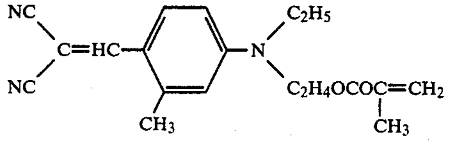

[λmax (chloroform): 446 nm]

COMPARATIVE EXAMPLE 6

Using the transfer sheet prepared in Example 9 and a recording sheet prepared in a manner similar to that in Example 5 except that the active hydrogen compound was not used, transfer recording and a test on the record stability were conducted, and as a result, the overlapped wood free paper sheet was remarkably stained in a yellow color due to the migration of the dye from the recording sheet, and also the color density of the recording sheet was remarkably reduced due to the migration of the dye.

EXAMPLE 10

Transfer recording was conducted in a manner similar to that in Example 9 except that the dye used in Example 9 was replaced by various dyes having the structural formulae set forth in Table 4, thereby it was possible to obtain records having good storage stability, respectively.

TABLE 4

| No. | Dye | Color of the Record | Max. Absorption Wavelength λmax (chloroform) (nm) |
|---|---|---|---|
| 1 | 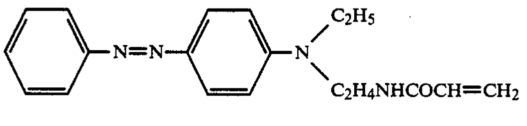 | Yellow | 420 |
| 2 | 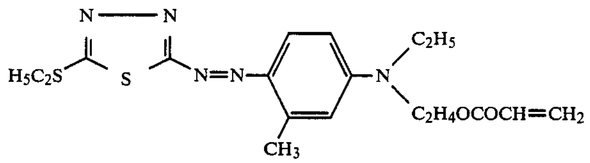 | Red | 515 |

TABLE 4-continued
| No. | Dye | Color of the Record | Max. Absorption Wavelength λmax (chloroform) (nm) |
|---|---|---|---|
| 3 | 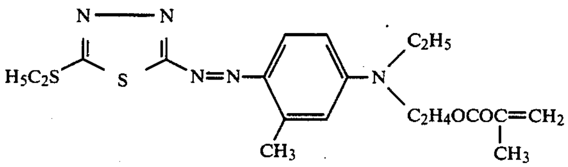 | Red | 515 |
| 4 | 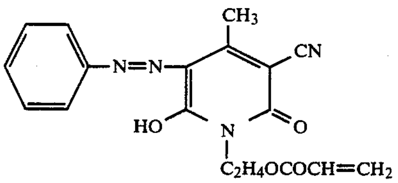 | Yellow | 440 |
| 5 | 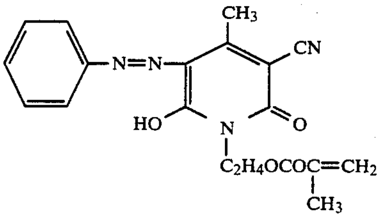 | Yellow | 440 |
| 6 | 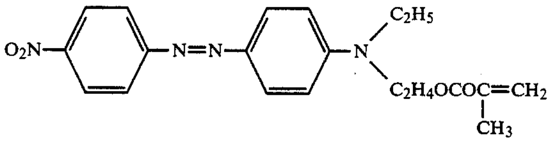 | Yellow | 473 |
| 7 | 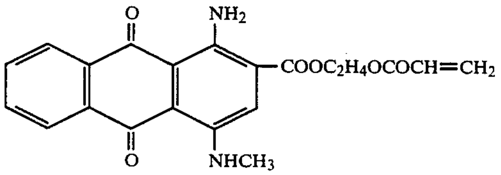 | Blue | 671 |
| 8 | 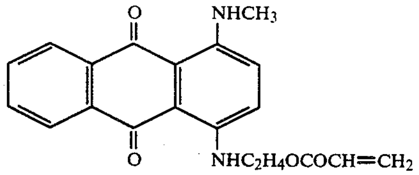 | Blue | 653 |
| 9 | 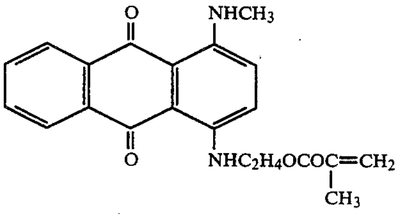 | Blue | 653 |
| 10 | 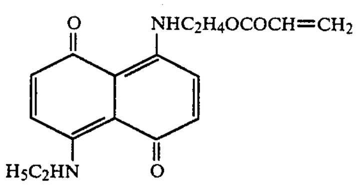 | Blue | 654 |

TABLE 4-continued
| No. | Dye | Color of the Record | Max. Absorption Wavelength λmax (chloroform) (nm) |
|---|---|---|---|
| 11 | 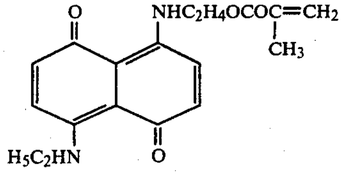 | Blue | 654 |
| 12 | 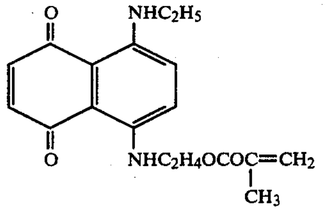 | Blue | 685 |
| 13 | 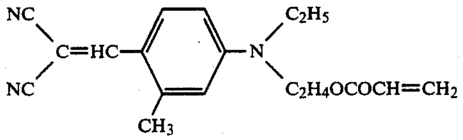 | Yellow | 446 |
| 14 | 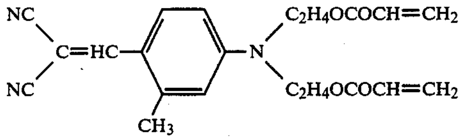 | Yellow | 442 |
| 15 | 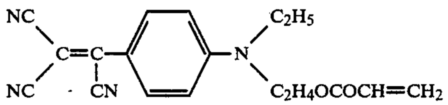 | Red | 520 |
| 16 | 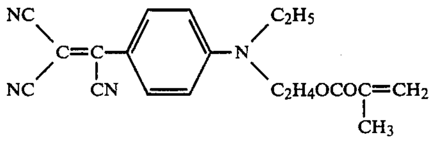 | Red | 520 |
| 17 | 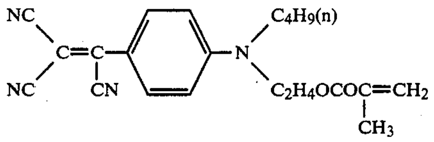 | Red | 521 |
| 18 | 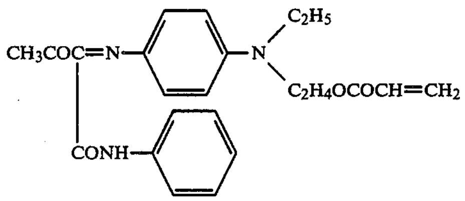 | Yellow | 444 |
| 19 | 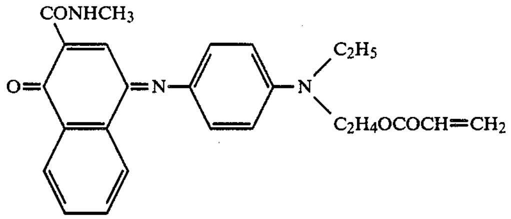 | Blue | 691 |

TABLE 4-continued

| No. | Dye | Color of the Record | Max. Absorption Wavelength λmax (chloroform) (nm) |
|---|---|---|---|
| 20 | 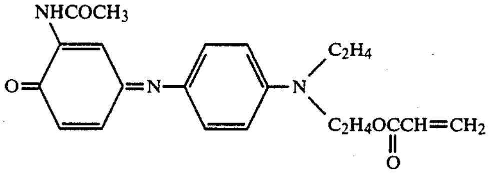 | Blue | 630 |
| 21 | 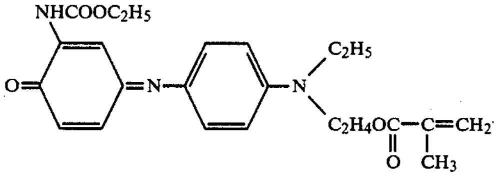 | Blue | 624 |
| 22 | 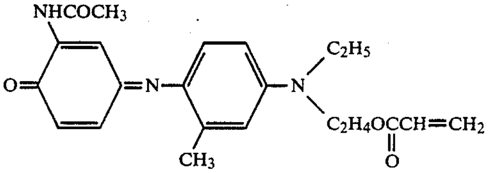 | Blue | 650 |
| 23 | 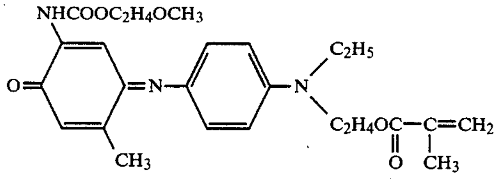 | Blue | 624 |
| 24 | 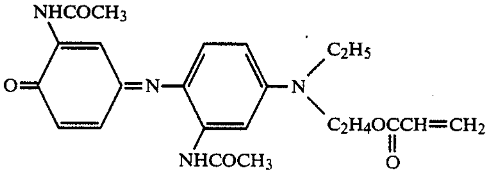 | Blue | 650 |
| 25 | 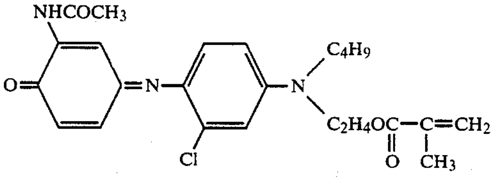 | Blue | 621 |
| 26 | 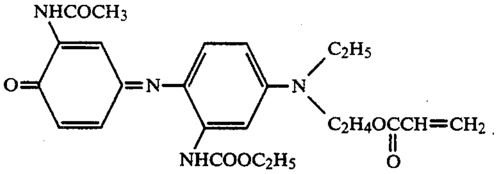 | Blue | 642 |

What is claimed is:

1. In a transfer recording method which comprises heating a transfer sheet having a color material layer containing a sublimable dye on a base according to the image information received, thereby subliming said sublimable dye and transfer recording it on an image receiving layer of a recording sheet, a transfer recording method which is characterized in that the color material layer of the transfer sheet contains a sublimable dye having a vinylsulfonyl group and the image receiving layer of the recording sheet contains an active hydrogen compound.

2. The transfer recording method according to claim 1 wherein the sublimable dye having a vinylsulfonyl group is an azo type dye of the formula:

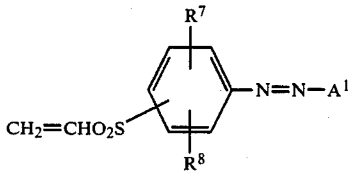

wherein $A^1$ is optionally substituted aminophenyl, pyrazolone, pyridone or pyridinyl, and $R^7$ and $R^8$ are each hydrogen, alkyl or alkoxy.

3. The transfer recording method according to claim 1 wherein the sublimable dye having a vinylsulfonyl group is an anthraquinone type dye of the formula:

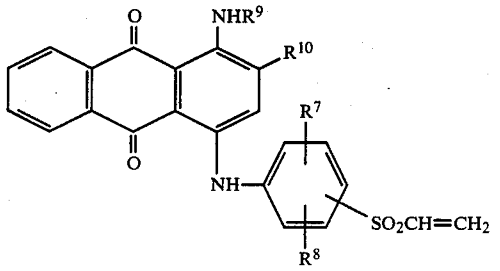

wherein $R^7$ and $R^8$ are each hydrogen, alkyl or alkoxy, $R^9$ is hydrogen or alkyl, and $R^{10}$ is hydrogen or cyano.

4. The transfer recording method according to claim 1 wherein the sublimable dye having a vinylsulfonyl group is a nitro type dye of the formula:

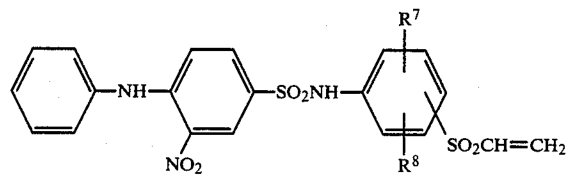

wherein $R^7$ and $R^8$ are each hydrogen, alkyl or alkoxy.

5. In a transfer recording method which comprises heating a transfer sheet having a color material layer containing a sublimable dye on a base according to the image information received, thereby subliming said sublimable dye and transfer recording it on an image receiving layer of a recording sheet, a transfer recording method which is characterized in that the color material layer of the transfer sheet contains a sublimable dye having an epoxy group and the image receiving layer of the recording sheet contains an active hydrogen compound or an organic acid anhydride.

6. The transfer recording method according to claim 5 wherein the sublimable dye having an epoxy group is an azo type dye of the formula:

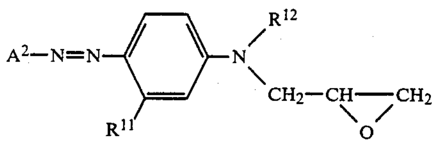

wherein $A^2$ is optionally substituted phenyl, benzothiazole, imidazole or thienyl, $R^{11}$ is hydrogen, alkyl or alkylcarbonylamino, and $R^{12}$ is alkyl.

7. The transfer recording method according to claim 5 wherein the sublimable dye having an epoxy group is an anthraquinone type dye of the formula:

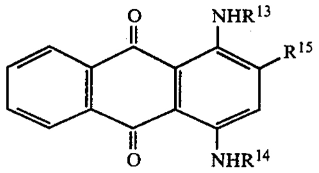

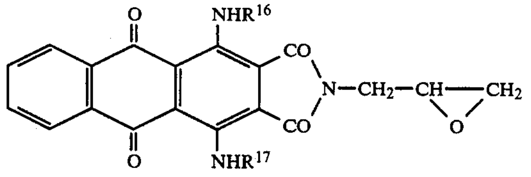

wherein $R^{13}$ and $R^{14}$ are each hydrogen, alkyl or

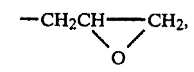

$R^{15}$ is hydrogen or

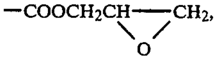

and $R^{16}$ and $R^{17}$ are each hydrogen or alkyl, with the proviso that when $R^{13}$ and $R^{14}$ are both hydrogen or alkyl, then $R^{15}$ is

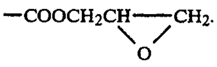

8. The transfer recording method according to claim 5 wherein the sublimable dye having an epoxy group is a naphthoquinone type dye of the formula:

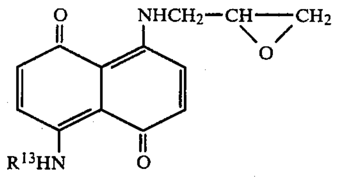

wherein $R^{13}$ is hydrogen, alkyl or

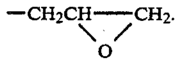

9. The transfer recording method according to claim 5 wherein the sublimable dye having an epoxy group is a styrylic dye of the formula:

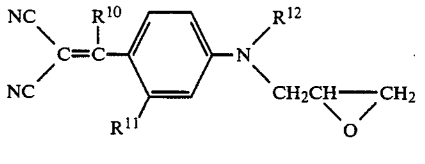

wherein $R^{10}$ is hydrogen or cyano, $R^{11}$ is hydrogen, alkyl or alkylcarbonylamino, and $R^{12}$ is alkyl.

10. The transfer recording method according to claim 5 wherein the sublimable dye having an epoxy group is an indoaniline type dye of the formula:

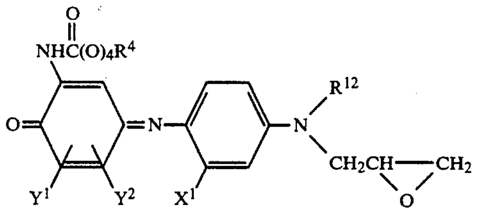

wherein n is 0 or 1, $R^4$ is alkyl or alkoxyalkyl, $R^{12}$ is alkyl, and $Y^1$, $Y^2$ and $X^1$ are each hydrogen, methyl, methoxy, halogen, acylamino or alkoxycarbonylamino.

11. In a transfer recording method which comprises heating a transfer sheet having a color material layer containing a sublimable dye on a base according to the image information received, thereby subliming said sublimable dye and transfer recording it on an image receiving layer of a recording sheet, a transfer recording method which is characterized in that the color material layer of the transfer sheet contains a sublimable dye having an acryloyl group or a methacryloyl group and the image receiving layer of the recording sheet contains an active hydrogen compound.

12. The transfer recording method according to claim 11 wherein the sublimable dye having an acryloyl group or a methacryloyl group is a styrylic dye of the formula:

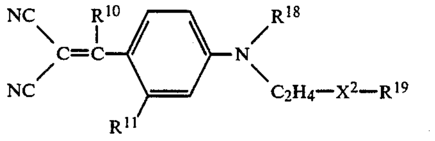

wherein $R^{10}$ is hydrogen or cyano, $R^{11}$ is hydrogen, alkyl or alkylcarbonylamino, $R^{18}$ is alkyl, $R^{19}$ is acryloyl or methacryloyl, and $X^2$ is —O— or —NH—.

13. The transfer recording method according to claim 11 wherein the sublimable dye having an acryloyl group or a methacryloyl group is an anthraquinone dye of the formula:

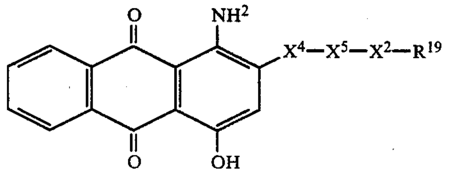

wherein $X^4$ is —O— or —S—, $X^5$ is alkylene, $X^2$ is —O— or —NH—, and $R^{19}$ is acryloyl or methacryloyl.

14. The transfer recording method according to claim 11 wherein the sublimable dye having an acryloyl group or a methacryloyl group is an indoaniline type dye of the formula:

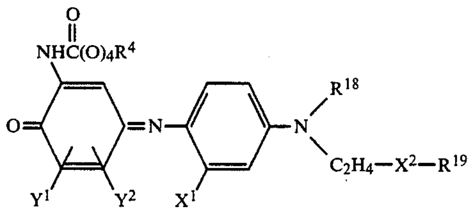

wherein n is 0 or 1, $R^4$ is alkyl or alkoxyalkyl, $R^{18}$ is alkyl, $Y^1$, $Y^2$ and $X^1$ are each hydrogen, methyl, methoxy, halogen, acylamino or alkoxycarbonylamino, $R^{19}$ is acryloyl or methacryloyl, and $X^2$ is —O— or —NH—.

15. The transfer recording method according to claim 11 wherein the sublimable dye having an acryloyl group or a methacryloyl group is an azo dye of the formula:

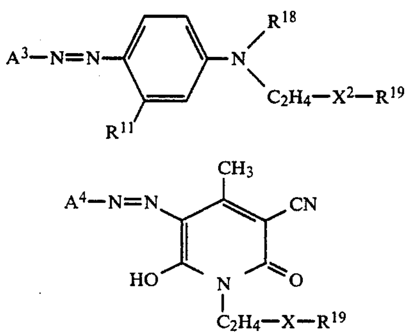

wherein $A^3$ is optionally substituted phenyl, benzothiazole, imidazole, thiadiazole or thienyl, $A^4$ is optionally substituted phenyl, $R^{11}$ is hydrogen, alkyl or alkylcarbonylamino, $R^{18}$ is alkyl, $R^{19}$ is acryloyl or methacryloyl, and $X^2$ is —O— or —NH—.

16. A heat-sensitive transfer recording sheet set which comprises a transfer sheet provided with a color material layer containing a sublimable dye, and a recording sheet having an image receiving layer capable of undergoing a covalent bond reaction with said subliming dye by heating said transfer sheet according to the image information received, a heat-sensitive transfer recording sheet set which is characterized in that the color material layer of the transfer sheet contains a sublimable dye having a vinylsulfonyl group and the image receiving layer of the recording sheet contains an active hydrogen compound.

17. A heat-sensitive transfer recording sheet set which comprises a transfer sheet provided with a color material layer containing a sublimable dye, and a recording sheet having an image receiving layer capable of undergoing a covalent bond reaction with said subliming dye by heating said transfer sheet according to the image information received, a heat-sensitive transfer recording sheet set which is characterized in that the color material layer of the transfer sheet contains a sublimable dye having an epoxy group and the image receiving layer of the recording sheet contains an active hydrogen compound or an organic acid anhydride.

18. A heat-sensitive transfer recording sheet set which comprises a transfer sheet provided with a color material layer containing a sublimable dye, and a recording sheet having an image receiving layer capable of undergoing a covalent bond reaction with said subliming dye by heating said transfer sheet according to the image information received, a heat-sensitive transfer recording sheet set which is characterized in that the color material layer of the transfer sheet contains a sublimable dye having an acryloyl group or a methacryloyl group and the image receiving layer of the recording sheet contains an active hydrogen compound.

* * * * *